(12) United States Patent
DiCarlo

(10) Patent No.: US 11,328,262 B2
(45) Date of Patent: May 10, 2022

(54) SYSTEM AND METHOD OF COLLABORATIVE ELECTRONIC PRODUCT SHOWING SCHEDULER AND SALE CLOSING PLATFORM

(71) Applicant: Dean DiCarlo, Huntington Beach, CA (US)

(72) Inventor: Dean DiCarlo, Huntington Beach, CA (US)

(*) Notice: Subject to any disclaimer, the term of this patent is extended or adjusted under 35 U.S.C. 154(b) by 637 days.

(21) Appl. No.: 14/852,145

(22) Filed: Sep. 11, 2015

(65) Prior Publication Data

US 2016/0078411 A1    Mar. 17, 2016

Related U.S. Application Data

(60) Provisional application No. 62/049,103, filed on Sep. 11, 2014.

(51) Int. Cl.
*G06Q 10/10* (2012.01)
*G06Q 50/16* (2012.01)

(52) U.S. Cl.
CPC ....... *G06Q 10/1095* (2013.01); *G06Q 50/167* (2013.01)

(58) Field of Classification Search
CPC ... G06Q 50/16; G06Q 10/047; G06Q 10/1093
See application file for complete search history.

(56) References Cited

U.S. PATENT DOCUMENTS

| | | | | |
|---|---|---|---|---|
| 6,973,432 B1* | 12/2005 | Woodard | ........... | G06Q 10/1097 705/313 |
| 7,333,943 B1* | 2/2008 | Charuk | ................ | G06Q 10/10 705/26.1 |
| 2001/0037229 A1* | 11/2001 | Jacobs | ................... | G06Q 10/02 705/7.14 |
| 2014/0247154 A1* | 9/2014 | Proud | .................... | H02J 7/025 340/870.09 |
| 2014/0249747 A1* | 9/2014 | Kosseifi | ............ | G01C 21/3415 701/428 |

OTHER PUBLICATIONS

Saturnino Luz et al., Chronos: A Tool for Interactive Scheduling and Visualisation of Task Hierarchies, Jul. 2009, IEEE.*

* cited by examiner

*Primary Examiner* — Julie M Shanker
(74) *Attorney, Agent, or Firm* — The Webb Law Firm

(57) ABSTRACT

A system and method for scheduling at least one appointment to view at least one piece of property is disclosed that includes receiving from a buyer at least one appointment request to view at least one piece of property, retrieving from a server computer a set of geographic coordinates corresponding to each of the at least one pieces of property, and generating a tentative appointment schedule connecting the at least one pieces of property in a manner which minimizes travel time between the at least one pieces of property. A device for scheduling at least one appointment to view at least one piece of property is also disclosed that includes at least one processor, at least one display device, and at least one computer readable medium containing program instructions that, when executed by the at least one processor, generate an itinerary based on at least one appointment request.

1 Claim, 12 Drawing Sheets

SYSTEM AND METHOD OF COLLABORATIVE ELECTRONIC PRODUCT SHOWING SCHEDULER AND SALE CLOSING PLATFORM

CROSS REFERENCE TO RELATED APPLICATIONS

This application claims the benefit of U.S. Provisional Application No. 62/049,103, filed Sep. 11, 2014, the disclosure of which is herein incorporated by reference in its entirety.

BACKGROUND OF THE INVENTION

Field of the Invention

The present invention relates generally to a system, method, and device for selling products or services. More specifically, the present invention relates to a system, method, and device that facilitates collaborative electronic appointment scheduling for viewing pieces of property or services.

Description of Related Art

Current industry practices for scheduling appointments to view pieces of property listed for sale are inefficient for items that require a buyer to physically see the piece of property before determining their interest in purchasing. This is particularly the case with the resale of pre-used property, such as automobiles, and lived-in assets, such as homes and other real estate, but may also manifest in other types of property. Some examples of other types of property susceptible to the inefficiencies of current practice include unique assets, assets which have multiple owners, assets for which the seller does not have a dedicated sales staff or storefront, and assets where the number of prospective buyers viewing the item must be limited. For example, property which the prospective buyer would typically need to test in order to form an opinion, for example a vehicle, can only be practically viewed by a single prospective buyer at a time. Property, such as residential real estate, which requires intensive interaction between the buyer and seller can similarly only be practically viewed by a single buyer at a time.

In such cases as those described above, scheduling a mutually agreed upon time for the buyer to examine the property for sale can be difficult, as buyers and sellers often have different availabilities. This problem is compounded when a property is owned by multiple sellers, or when the seller is represented by a team of agents, themselves having different availabilities. There is no convenient method for sellers or agents to communicate amongst themselves to develop a consensus for appointment times or to collaboratively approve appointments. Current industry practice does not provide for generating a central schedule that is available for all to see, nor does there exist an elegant solution to make management and dissemination of the central schedule efficient.

Thus, there is a need for a method, system, and apparatus which allows simple and efficient collaboration between the buyer and seller, and between the members of the selling team, to schedule appointments acceptable to all participants involved in a sales transaction.

Additionally, buyers, particularly in the area of residential real estate, may prefer to view multiple properties on a single trip, both for the sake of convenience and to have a more contemporaneous comparison of the properties. However, the current practices for creating an itinerary for such a trip is inconvenient, requiring significant collaboration between the buyer and multiple sellers, often resulting in impossible to schedule appointments which force the buyer to discard their itinerary and start anew. Even if the prospective buyer retains an agent to assist him or her with the process, the difficulty and tediousness of the process is merely shifted to the agent.

Current practice for planning an itinerary to view multiple properties is predominantly manual. The prospective buyer first accesses a database of listings of available properties and determines which of those properties he wishes to schedule an appointment to view. The buyer then provides an agent with a list of those properties he or she wishes to view, and the agent attempts to map out the most convenient and efficient route between the properties to be viewed. Ideally, the properties will be scheduled in an order which minimizes travel time and distance between the properties.

Concurrently with scheduling appointments based on an efficient route, the buyer's agent must work around the showing instructions for each property. The showing instructions indicate how an appointment to view that property must be scheduled. Some properties do not require an appointment to view; a buyer may simply arrive at the property unannounced. However, a substantial portion of available properties has contingencies which require affirmative steps to be taken by the buyer or his agent before the property can be viewed. Some properties require the buyer or his agent to call the seller of the property to inform the seller when the buyer will arrive. Other properties require the buyer or his agent to call the seller or the seller's agent to arrange a time which is mutually acceptable to both the buyer and the seller. Still other properties require that the seller's agent be present at a viewing appointment.

Typically, the agent will first attempt to schedule all the contingent appointments, and then add to the itinerary properties which the buyer may show up to unannounced. This is, of course, an oversimplification of the process because each appointment is dependent on the appointments before and after it to maintain the itinerary. One property which is unavailable to be shown at a desired time may create a cascading effect of scheduling conflicts which necessitates that the itinerary be discarded and started anew. For example, if a property must be moved in the itinerary to accommodate a seller, it may conflict with a previously scheduled appointment, requiring that the previously scheduled appointment also be rescheduled. Further, rescheduling an appointment may impact the travel time between the appointments preceding and following that appointment, potentially making it impossible to get to an appointment on time. It is impossible to tell how many iterations the itinerary must go through before it is acceptable to the buyer and sellers.

Additionally, manually scheduling an itinerary is susceptible to factors outside the buyer's or sellers' control. For example, the buyer may need to spend a longer time than initially estimated at one appointment, causing the buyer to be late to one or more subsequent appointments. Other factors, such as traffic and weather, may also cause the buyer to be late to one or more appointments. In such circumstances, the buyer's agent may have to contact the seller's agent to reschedule appointments. However, there is no guarantee that the seller or the seller's agent can accommodate last-minute requests to reschedule an appointment.

It can be appreciated from this description that scheduling a multitude of time-sensitive appointments often becomes a frustratingly iterative process since each appointment depends on the appointments made before it. If a seller's agent cannot accommodate an appointment at a desired time, it may cause the remainder of the schedule to be unworkable, requiring the buyer's agent to revise some or all of the schedule.

An additional problem with the current practice is that buyers often do not have the forethought to record their opinions and observations of the properties they view. After some amount of time has elapsed since viewing a property, a buyer may have a difficult time distinguishing between one or more properties the buyer viewed, or recalling particular features of a certain property. These problems are exacerbated the more properties a buyer views and the more time has elapsed since the viewing of a property. Furthermore, recording opinions and observations can allow for machine learning to use predictive analytics to find and share other suitable properties in which the buyer may have an interest.

Thus, a better alternative is needed to optimize the itinerary scheduling process and to allow buyers to record their observations of a property in real time.

SUMMARY OF THE INVENTION

It is generally the object of the present invention to provide a system, method, and device by which sellers of a product and prospective buyers of that product can collaboratively schedule a time at which to view that product.

According to a non-limiting embodiment, the present invention discloses a method of buyer-centered appointment scheduling for coordinating external factors relating to a target plurality of properties, the method including the steps of: receiving from a buyer, at a server computer, an appointment request to view the plurality of properties; receiving from the buyer, at the server computer, a date and a time at which the buyer desires to begin scheduling the appointment request; retrieving from the server computer a set of geographic coordinates corresponding to each of the properties; and generating an appointment schedule using factors for the properties, wherein at least one factor for generating the appointment schedule is minimization of travel time, based at least partially on the set of geographic coordinates corresponding to each of the properties.

In another non-limiting embodiment, the present discloses a method of buyer-centered appointment scheduling further including the steps of: assigning each of the plurality of properties to a corresponding timeslot, wherein each corresponding timeslot is at least partially determined by retrieving from the server computer an estimated travel time, wherein the estimated travel time is a factor for generating the appointment schedule; transmitting, from the server computer, a request to sellers of each of the plurality of properties to accommodate the buyer at the corresponding timeslot; and receiving from the sellers, at the server computer, a response stating an availability for the corresponding timeslot, wherein the availability is a factor for generating the appointment schedule.

In another non-limiting embodiment, the present invention discloses a method of agent-centered appointment scheduling for coordinating external factors relating to a plurality of buyers, the method including the steps of: receiving from a first buyer, at a server computer, a first appointment request to view a property; receiving from the first buyer, at the server computer, a date and a time at which the buyer desires to begin scheduling the first appointment request; generating an appointment schedule using factors for the plurality of buyers, wherein at least one factor for generating the appointment schedule is a second appointment request of a second buyer.

In another non-limiting embodiment, the present invention discloses a method of agent-centered appointment scheduling further including the steps of: assigning the property to a corresponding timeslot, wherein the corresponding timeslot is at least partially determined by retrieving from the server computer an estimated travel time; transmitting, from the server computer, a request to a seller of the property to accommodate the first buyer at the corresponding timeslot; and receiving from the seller, at the server computer, a response stating an availability for the corresponding timeslot, wherein the availability is a factor for generating the appointment schedule.

In another non-limiting embodiment, the present invention provides a feedback application which further includes the steps of soliciting feedback from a user relating to the user's perception of the at least one piece of property, wherein the feedback comprises a plurality of ratings corresponding to a plurality of property attributes; storing the feedback from the user in the server computer; generating an aggregate feedback score by combining the feedback from the user with existing feedback stored on the server computer; and generating an automated valuation model based on the aggregate feedback score, wherein the automated valuation model assigns an estimated market value to the at least one piece of property, and wherein the automated valuation model at least partially serves as a price estimator for other pieces of property.

According to yet another non-limiting embodiment, the present invention discloses a computerized appointment making and scheduling system for scheduling a plurality of buyers traveling to properties in a geographical area, said system including: a database for storing information relating to a plurality of appointments that have been made, a plurality of property information listing parameters, when and how a property may be viewed, information specifying a sequence of said properties to be visited by a particular buyer, the times the buyer is scheduled to enter and leave each of said properties; an itinerary handler for planning appointment requests to view properties for buyers, such that the itinerary handler reviews factor information about the requests and updates a buyer schedule for viewing properties, retrieving stored information for making user itineraries based in part on geographical location data to arrange the properties into a route for minimizing travel time between properties; an appointment request handler for sending requests for appointments to sellers relating to the itinerary, to obtain response information about properties requested by buyers, and the responses confirming or providing conflict information; and an appointment scheduler for periodically accessing and synchronizing the itinerary with the appointment request responses, to obtain information relating to appointments, using this information to generate new appointment requests, based on priority information associated with the buyer appointment requested properties and receiving appointment request response information from said appointment request handler.

It is a further object of the present invention to provide a safety device which may be worn by any participant in a sales transaction. According to another preferred but non-limiting embodiment, the present invention discloses a wearable monitoring device comprising at least one processor and at least one computer-readable medium comprising program instructions that, when executed by the at least one processor, cause the monitoring device to: determine a location of the user; monitor at least one vital sign of the user; alert a supervisor of the user of the location of the user;

and alert a supervisor of the user when any of the at least one vital signs of the user is outside a predetermined baseline range.

According to yet another non-limiting embodiment, the present invention discloses a mobile device for displaying an editable itinerary for scheduling at least one appointment for at least one piece of property, the mobile device including: at least one processor; at least one display device; and at least one computer-readable medium comprising program instructions that, when executed by the at least one processor, cause the mobile device to: display, on the at least one display device, a tentative appointment schedule for the at least one piece of property; receive scheduling instructions from a user; revise the tentative appointment schedule per the scheduling instructions; and display, on the at least one display device, a final itinerary, wherein the final itinerary includes an arrival time and a departure time for each of the at least one appointment.

According to yet another non-limiting embodiment, the present invention discloses a non-transitory machine-readable medium including program instructions that, when executed by at least one mobile device including at least one processor, cause the mobile device to: retrieve, from a server computer, a tentative appointment schedule; generate a display on a mobile device, the display including an editable itinerary, the editable itinerary comprising at least one appointment having a start time and an end time; receive scheduling instructions from a user, the scheduling instructions including at least one of the following: adding a new appointment, changing any of the at least one appointments, deleting any of the at least one appointment, finalizing the editable itinerary, or any combination thereof; revise the tentative appointment schedule based at least partially on the scheduling instructions; and generate a display on the mobile device, the display including a final itinerary, the final itinerary comprising at least one appointment having an arrival time and a departure time.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWING(S)

DESCRIPTION OF THE INVENTION

Figure 1:
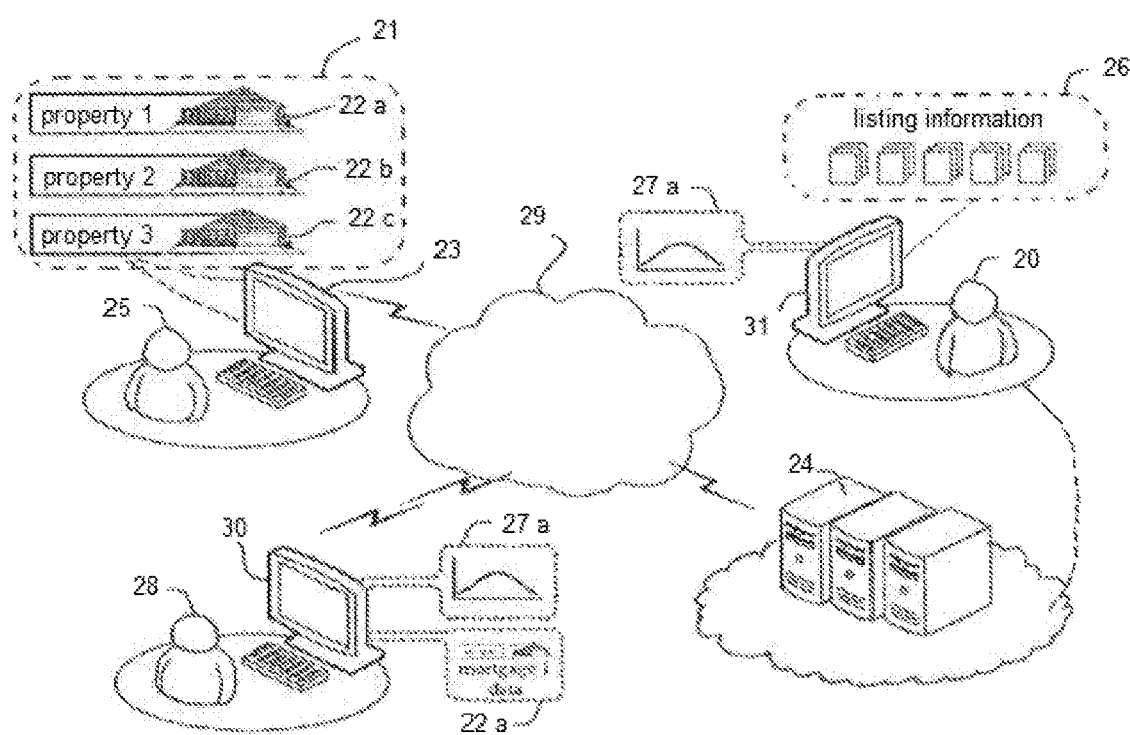
FIG. 1 illustrates an embodiment of the scheduling system of the present invention.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The term "property" and derivatives thereof, as used hereinafter, includes, but is not limited to, real estate, automobiles, and any other saleable asset new or preowned. The term "seller" and derivatives thereof, as used hereinafter, includes both the owner of a piece of property for sale as well as anyone acting on behalf of that owner. The term "buyer" and derivatives thereof, as used hereinafter, includes the prospective buyer of a piece of property as well as anyone acting on behalf of that prospective buyer.

The terms "communication" and "communicate" and derivatives thereof, as used hereinafter, refer to the receipt or transfer of one or more signals, messages, commands, or other types of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, and/or routed between the first and second unit or component. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

The present invention provides a system, method, and device for a collaborative electronic product showing scheduler and sale platform. The present invention is user friendly for all market participants and operates with an efficiency that is not possible using traditional, manual methods of scheduling appointments to view property.

With reference to FIG. 1, a system is shown for facilitating a collaborative electronic product showing scheduler and sale closing platform. A seller 20 having a piece of property he or she wishes to sell communicates with a scheduling entity through communication means, such as a seller's computer 31, connected to the Internet 29. It will be appreciated that any number of communications means may be utilized, including, but not limited to, web-based services and mobile phone applications. The seller 20 lists the piece of property for sale by entering property listing information 26 into the scheduling entity as described herein. The scheduling entity transfers the property listing information 26 to a server computer 24, where the property listing information 26 is stored on a data storage unit or device such as a hard disk drive.

It will be appreciated that the seller 20 may include, in addition to the owner of the property, a team of seller's agents referred to herein as administrators, with a chief administrator being referred to herein as a super-administrator. It may be further appreciated that any number of sellers may be simultaneously active on the scheduling entity.

A buyer 28 communicates with the scheduling entity through communication means, such as a buyer's computer 30 connected to the Internet 29, in order to view the property listing information 26 stored on the server computer 24. It will be appreciated that any number of communications means may be utilized, including, but not limited to, web-based services and mobile phone applications. The buyer's computer 30 retrieves the property listing information 26 from the server computer 24, and displays the property listing information 26 on a graphical display, such as a webpage, on the buyer's computer 30 as a property listing 22a. The buyer views the property listing 22a and associated analytical data 27a through the buyer's computer 30 and determines if he or she wishes to schedule an appointment to view the property associated with the property listing 22a. If the buyer 28 identifies a property he would like to schedule an appointment to view, the scheduling entity stores the corresponding property listing 22a in a favorites list 21 stored on the server computer 24.

With continuing reference to FIG. 1, a buyer's agent 25 working on behalf of the buyer 28 can view, through a communication means such as an agent's computer 23, one or more property listings 22a, 22b, 22c which the buyer 28 stored in the favorites list 21 stored on the server computer 24. The buyer 28 and the agent 25 arrange a date to view the properties corresponding to each property listing 22a, 22b, 22c. The agent 25 enters that date into the scheduling entity, from which the scheduling entity creates a final itinerary using the methods described herein.

Figure 6:
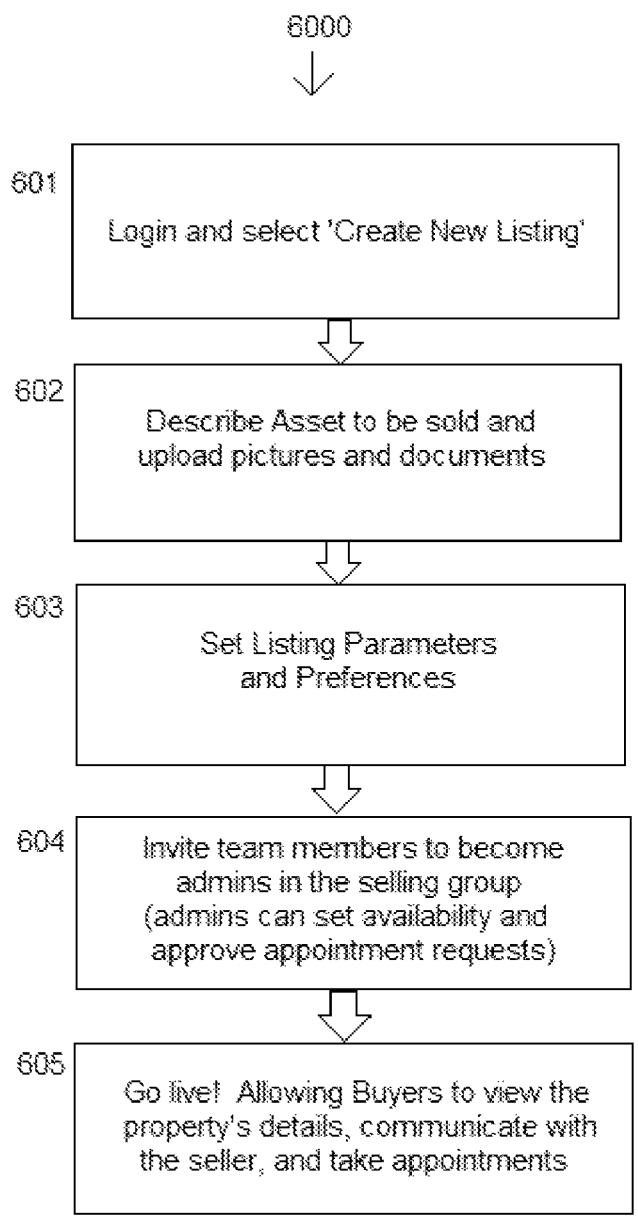
FIG. 6 illustrates a flow diagram of the listing creation process of the scheduling system of the present invention.

Referring now to FIG. 6, a property listing creation process 6000 is shown, by which the seller 20 lists a piece of property for sale. A separate, unique property listing 22 must be created for each piece of property which is to be put up for sale. Each property listing 22 is created by the super-administrator, who is either the seller 20 of the piece of property or another party designated to act on behalf of the seller 20. Beginning at step 601, the super-administrator logs into the scheduling entity and launches an application which allows the super-administrator to create a new property listing 22. At step 602, the super-administrator inputs property listing information 26 which provides a description of the piece of property being sold. For example, the property information 26 may include a written description of the property, pictures of the property, and any additional documents which may be material to the buyer 28. The property listing information 26 is transferred to and stored on the server computer 24.

Each property listing 22 further includes a plurality of listing parameters which explains when and how the buyer 28 may view the piece of property. The plurality of listing parameters is entered in the scheduling entity by the super-administrator at step 603. In a non-limiting, exemplary embodiment, a first field contains a date on which the piece of property is first available to be viewed. A second field and third field contain a first available and a last available viewing appointment of each day, respectively. A fourth field contains a length of notice which must be given to the seller 20 before a showing can be scheduled. A fifth field contains a list of days on which appointments may not be scheduled. A sixth field contains a time allotted by the seller 20 for each appointment. A seventh field contains a number of appointments which may be scheduled concurrently—that is, how many unique buyers 28 may schedule an appointment at the same or overlapping times. An eighth field contains how far in advance an appointment can be scheduled. A ninth field contains showing instructions which are sent to the buyer 28 or agent 25 when an appointment is confirmed. A tenth field contains contact information for the seller 20 which the buyer 28 may use to communicate with the seller 20 regarding questions about the piece of property. Other embodiments may include more or less fields than the exemplary embodiment described above. The nature of the property being sold will dictate the number and content of the fields. The information contained in the plurality of listing parameters is transferred to and stored on the server computer 24.

With continuing reference to FIG. 6, at step 604, the super-administrator designates one or more administrators for the property listing 22. The administrators have the authority to set the availability of appointments and to approve appointments (refer to FIG. 3 and FIG. 4). Availability of appointments for each piece of property is divided into a plurality of timeslots corresponding to different times of day. According to their individual schedules, administrators designate each timeslot as either "Open", "Available", "Unavailable", or "Pending Approval". This functionality allows the one or more administrators to collaboratively create a database of showing availabilities for the plurality of timeslots. A timeslot is designated as "Open" if it corresponds to a time at which the buyer 28 may arrive unannounced to view the property. A timeslot is designated as "Available" if it corresponds to a time at which the seller 20 and/or the one or more administrators are willing to schedule an appointment, but the buyer 28 must first contact the seller 20 to confirm the appointment. A timeslot is designated as "Unavailable" if it corresponds to a time at which the seller 20 and/or the one or more administrators are unwilling to schedule an appointment. A timeslot is designated as "Pending Approval" if it corresponds to a time at which the seller 20 and/or the one or more administrators are willing to schedule an appointment, but the buyer 28 must first contact the seller 20 to confirm the appointment, and the seller 20 retains the right to decline the appointment for any reason. It may be appreciated that designations other than "Open", "Available", "Unavailable", and "Pending Approval" may be utilized to fit the particular needs of the seller 20.

At step 605, the super-administrator enables the property listing 22, making it publically viewable through a communication means such as the buyer's computer 30 connected to the Internet 29. Once the property listing 22 is enabled, the buyer 28 viewing the property listing 22 may add the property listing 22 to the favorites list 21, schedule an appointment (refer to FIG. 3 herein), and communicate with the seller 20 using the contact information provided by the seller 20 at step 603, above.

Figure 2:
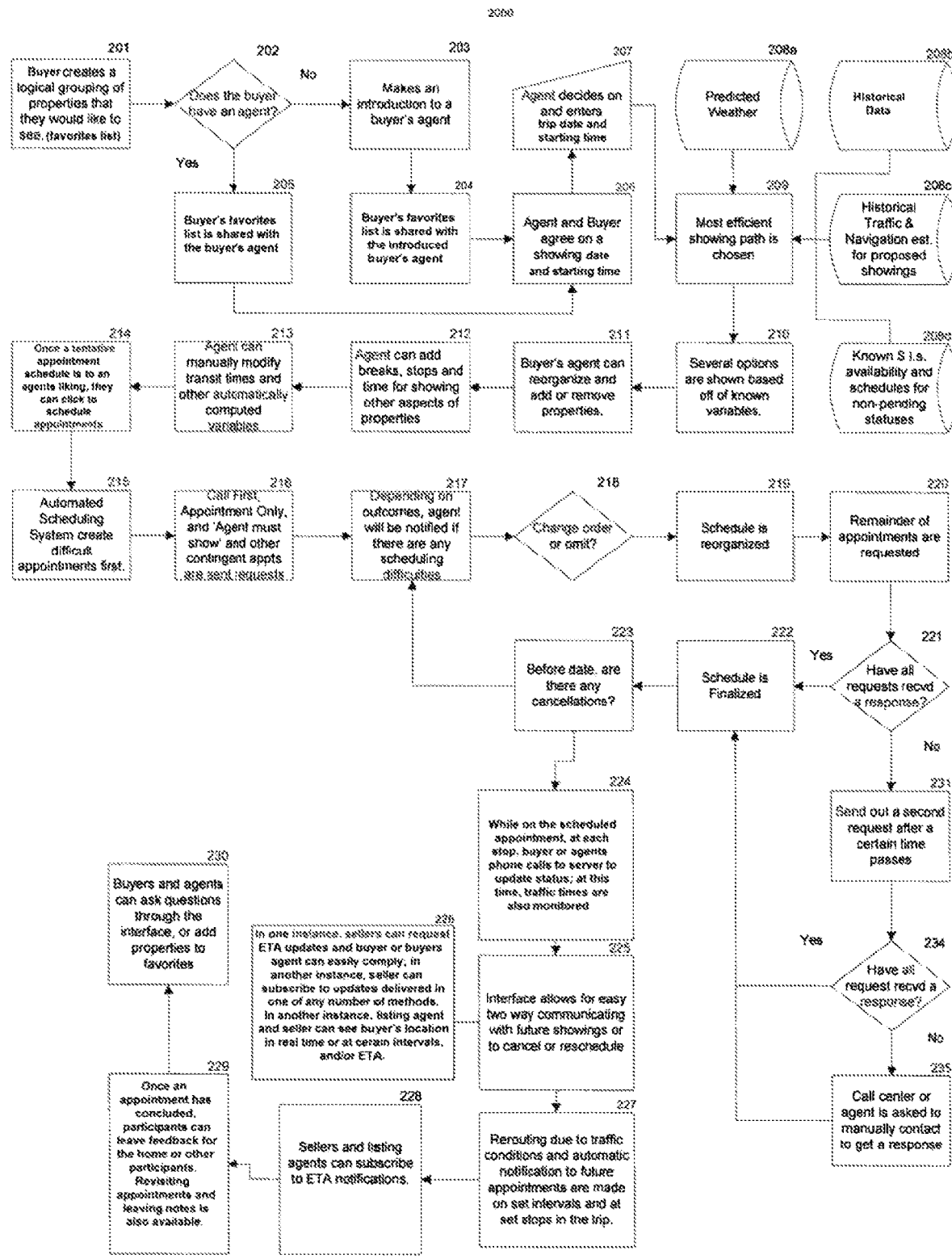
FIG. 2 illustrates a flow diagram for the itinerary scheduling process of the scheduling system of the present invention.

Referring now to FIG. 2, an itinerary creation process 2000 begins at step 201 when the buyer 28 creates the favorites list 21 of properties he or she would like to schedule appointments to view. At step 202, if the buyer 28 has retained the agent 25, the itinerary creation process 2000 proceeds to step 205 and the favorites list 21 is shared with the agent 25. If the buyer 28 has not retained the agent 25, the itinerary creation process 2000 proceeds to step 203, and the buyer 28 is provided with and introduced to the agent 25. In one embodiment, the buyer 28 may be introduced to a plurality of potential agents from whom the buyer 28 may select one to represent the buyer as the agent 25. In this case, the buyer 28 will have multiple choices. The scheduling entity will facilitate communication with the plurality of potential agents to allow the buyer 28 to select the most desirable agent 25. This creates an advantage for the buyer 28 over current practices in which the agent 25 is automatically assigned to the buyer without consideration of the individual needs and preferences of the buyer 28.

The favorites list 21 is then shared with the agent 25 at step 204. At step 206, the buyer 28 and the agent 25 determine a trip date and a trip starting time to view the properties in the favorites list 21, and then, at step 207, the agent 25 enters the trip date and the trip starting time into the scheduling entity through a communications means, such as the agent's computer 31.

With continuing reference to FIG. 2, at step 209, the scheduling entity generates a tentative appointment schedule for viewing the properties in the favorites list 21. The scheduling entity uses historical traffic and navigation data 208c gathered from the server computer 24 to determine an expected travel time between each property in the favorites list 21. The scheduling entity also gathers from the server computer 24 the property listing 22 corresponding to each property in the favorites list 21. In particular, the scheduling entity accesses the plurality of listing parameters regarding the scheduling availability for each property listing 22 in the favorites list 21. The scheduling entity uses historical traffic and navigation data 208c to arrange the properties in the favorites list 21 on a tentative route which minimizes the travel time between the properties in the favorites list 21. Concurrently, the scheduling entity updates the tentative appointment schedule beginning at the trip date and the trip starting time input by the agent 25 at step 206. As each property in the favorites list 21 is added to the tentative route, the scheduling entity increments the tentative appointment schedule to account for the travel time to that property and the estimated appointment time corresponding to that property. The scheduling entity continuously compares the tentative appointment schedule to the property listing information 26 for each property in favorites list 21 added to ensure that a property is not scheduled in a timeslot which the seller 20 has designated as "Unavailable". In the event that an appointment is not scheduled in a timeslot which the seller 20 has designated as "Unavailable", the scheduling entity adjusts the tentative route to avoid the timeslot designated as "Unavailable". Many such adjustments to the schedule may be necessary in order to generate a tentative appointment schedule which avoids placing any property in the favorites list 21 in a timeslot designated as "Unavailable." In the event that it is not possible to avoid timeslots designated as "Unavailable", the scheduling entity drops any impossible to schedule appointments from the tentative appointment schedule and sends a message informing the agent 25 of any appointments that have been dropped.

At step 210, the scheduling entity displays the tentative appointment schedule on a graphical user interface (GUI) of a communication means viewable by the agent 25, such as agent's computer 23 or a mobile device. At step 211, the agent 25 may use the GUI to manually reorganize, delete, or add appointments to the tentative appointment schedule.

At step 212, the agent 25 is able to add breaks or stops to the schedule. For example, the agent 25 may add a short stop to the schedule to show the buyer 28 a park, beach, or other attraction near a property in the tentative appointment schedule. At step 213, the agent 25 can manually modify transit times between properties, based on the personal experience of the agent 25 or other concerns with the automatically generated tentative appointment schedule. If the agent 25 makes any adjustments to the tentative appointment schedule in steps 211 through 213, the scheduling entity updates the tentative appointment schedule to account for those adjustments' effects on the subsequent appointments. Concurrently, the scheduling entity continuously compares the tentative appointment schedule to the property listing information 26 for each property in favorites list 21. The scheduling entity prohibits the agent 25 from making any adjustment to the tentative appointment schedule which causes an appointment to be scheduled in a timeslot which the seller 20 has designated as "Unavailable".

At step 214, once the agent 25 is satisfied with the tentative appointment schedule, the agent 25 executes a command on the GUI causing the scheduling entity to schedule the appointments on the tentative appointment schedule. For each appointment in the tentative appointment schedule, the scheduling entity retrieves from the server computer 24 the property listing information 26 corresponding to the property of that appointment. If the property is designated as "Open" in the property listing information 26, the scheduling entity confirms that appointment in the tentative appointment schedule.

At step 215, the scheduling entity begins scheduling any remaining appointments in the tentative appointment schedule, beginning with those having the strictest scheduling requirements. That is, properties which are designated as "Pending Approval" in the corresponding property listing information 26 are scheduled first so that if the seller 20 denies the appointment, the tentative schedule may be adjusted before other appointments are scheduled. At step 216, the scheduling entity sends an appointment request to the seller 20 of any property designated as "Pending Approval" in the corresponding property listing information 26. The scheduling entity then sends an appointment request to the seller 20 of any property designated as "Available" in the corresponding property listing information 26.

At step 217, as appointment requests are sent and responded to by the seller 20 of each property, the agent 25 is notified of any scheduling difficulties. For example, if the seller 20 denies the appointment request for a property which is designated as "Pending Approval" in the corresponding property listing information 26, the scheduling entity will notify the agent 25. Any appointment which does not pose a scheduling difficulty is confirmed. If none of the appointments pose a scheduling difficulty, the system proceeds to step 222. In the event of a scheduling difficulty, at step 218, the agent 25 either selects a new time for the appointment responsible for the scheduling conflict to accommodate the seller 20, or drops the appointment responsible for the scheduling conflict from the tentative appointment schedule. At step 219, the scheduling entity reorganizes the schedule according to the agent's 25 response, and proceeds to schedule the remainder of the appointments, at step 220. The scheduling entity repeats this process of scheduling appointments and reporting out scheduling difficulties until all of the appointments have either been confirmed or dropped from the tentative appointment schedule.

At step 221, the scheduling entity assesses whether all of the appointment requests have received a response from the corresponding seller 20. If all of the appointment requests have received a response from the seller 20, the system proceeds to step 222. If not all of the appointment requests have received a response from the seller 20, at step 231, the scheduling entity sends a second appointment request to each seller 20 who has not responded after a preset period of time. At step 234, the scheduling entity again assesses whether all of the appointment requests have received a response from the corresponding seller 20. If so, the scheduling entity proceeds to step 222. If not, the scheduling entity notifies the agent 25, and the agent 25 manually contacts each seller 20 who has not responded to the appointment request. The scheduling entity then proceeds to step 222. The process of scheduling each individual appointment in the tentative appointment schedule is described in greater detail in reference to an appointment creation process 3000 of FIG. 3, below.

At step 222, after all the appointment requests have received a response from the seller 20, the tentative appointment schedule is finalized and becomes the final itinerary. At step 223, the scheduling entity continuously monitors the status of all appointments in the final itinerary. The seller 20 of each property in the final itinerary may cancel the corresponding appointment at any time prior to the appointment by sending a cancellation notice to the scheduling entity. If the scheduling entity receives a cancellation notice from the seller 20, the scheduling entity notifies the buyer 28 and the agent 25 of the cancellation. The agent 25 then has the option to reschedule the final itinerary to get rid of a vacant timeslot caused by the cancellation. To accomplish this, the scheduling entity returns to step 217 and proceeds from step 217 as described above.

At step 224, the buyer 28 and the agent 25 meet on the trip date at the trip starting time and begin travelling to a first appointment in the final itinerary. The buyer 28 or the agent 25 uses a mobile device to call the server computer 24, indicating to the scheduling entity that the buyer 28 has begun travelling. The scheduling entity then communicates to the seller 20 of the first appointment that the buyer 28 is en route to the first property in the final itinerary. The scheduling entity then connects to a global positioning system (GPS) and displays a map on a display device of the mobile device to guide the buyer 28 and the agent 25 to the first property in the final itinerary. The GPS continuously accesses real time traffic data from the server computer 24 connected to the Internet 29 and displays the real time traffic data on the display device of the mobile device. The GPS also continuously transmits the geographic location of the mobile device to the server computer 24. When the geographic location of the mobile device is within a predetermined range of the geographic location of the first property in the final itinerary, the scheduling entity retrieves the property listing information 26 from the server computer 24 and displays the property listing information 26 on the display device of the mobile device for the buyer 28 and the agent 25 to view. Step 224 is repeated for each appointment in the final itinerary.

At step 225, as the buyer 28 views properties and travels between appointments in the final itinerary, the scheduling entity facilitates real time communication between the seller 20 and the buyer 28. For example, the seller 20 may send a cancellation notification to the scheduling entity, and the scheduling entity forwards the cancellation notification to the mobile device of the buyer 28. In a non-limiting embodiment, at step 226, the scheduling entity allows the seller 20 to send a prerecorded message, such as "What is your estimated time of arrival?", from the server computer 24 to the mobile device of the buyer 28. The buyer 28 can then communicate a response to the seller 20 through the mobile device. In another non-limiting embodiment, the seller 20 may access real time location data of the buyer from the server computer 24, as the GPS transmits the geographic location of the mobile device to the server computer 24.

At step 227, the scheduling entity continuously accesses the real time traffic data from the server computer 24 connected to the Internet 29 and reroutes the buyer and the agent to minimize travel time. Intermittently, the scheduling entity compares the real time traffic data accessed from the server computer 24 to the geographic location of the buyer 28 as determined by the GPS. Based on this comparison, if the scheduling entity determines it is impossible for the buyer 28 to arrive at an appointment at the time scheduled in the final itinerary, the scheduling entity sends a late notification to the seller 20 through the server computer 24.

At step 229, after the buyer 28 has completed all the appointments in the final itinerary, the scheduling entity stores the individual property listing information 26 for each property in the final itinerary to the server computer 24. The buyer 28 or agent 25 can then use the scheduling system to leave feedback on the each property in the final itinerary. The feedback is entered into any communication means, for example, the agent's computer 23 or the mobile device, and stored in the server computer 24. The process by which users enter feedback is described in greater detail in reference to FIG. 9 and FIG. 10, herein.

The buyer 28 may also use the scheduling entity to attach notes on each property in the final itinerary. Through any communication means, such as the buyer's computer 30, the buyer 28 may record their perception of the property and store the perception in the server computer 24 to assist the buyer 28 in comparing different properties.

At step 230, the buyer 28 may continue to access the final itinerary and associated property listing information 26 and the notes from the server computer 24. Additionally, the buyer 28 and agent 25 can use the scheduling entity to communicate with the seller 20, for example, using the agent's computer 23.

Figure 3:
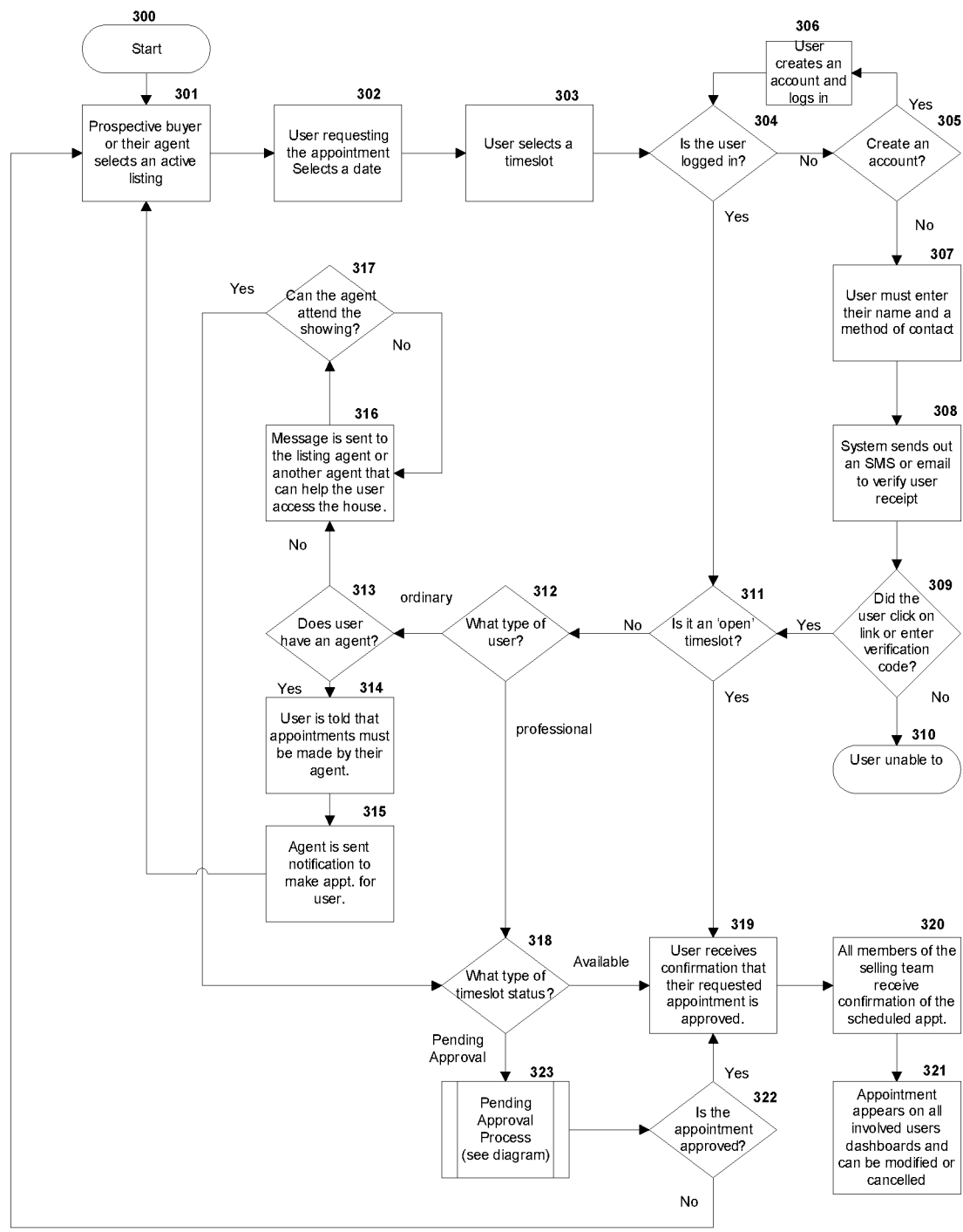
FIG. 3 illustrates a flow diagram for the appointment creation process of the scheduling system of the present invention.

Referring now to FIG. 3, an appointment scheduling process 3000 for scheduling each appointment in the favorites list 21 begins at step 300. At step 301 a user selects a property listing 22 from the database stored on the server computer 24 and viewable on the Internet 29. At steps 302 and 303 the user selects a desired timeslot for the appointment. In one embodiment, the desired timeslot is selected automatically by the scheduling entity based upon the tentative appointment schedule generated by the scheduling entity.

If the user is not logged into the scheduling entity, the scheduling entity prompts the user to log in at step 304. If the user is not registered with the scheduling entity, the scheduling entity prompts the user to either register or provide a verified method of contact, at step 305. If the user chooses to register, at step 306 the system guides the user through a registration process and logs the user into the scheduling entity. If the user chooses to forgo registering, at step 307 the scheduling entity prompts the user to enter his or her name and a preferred method of contact. For example, the preferred method of contact may be a short message service (SMS) message or email. At step 308, the scheduling entity sends a registration confirmation message to the user via the preferred method of contact. At step 309, the user verifies his or her registration, for example, by activating a clickable link in the registration confirmation message or by manually entering a confirmation code provided with the registration confirmation message. If the user fails to verify his or her registration, the user is unable to schedule an appointment (step 310).

If the user is logged into the scheduling entity, or if the user has completed the verification process of step 309, the scheduling entity proceeds to step 311 and retrieves the property listing information 26 from the server computer 24. At step 319, if the timeslot selected by the user in step 303 is designated as "Open", the system displays a message confirming the appointment. If the timeslot is not designated as "Open" in the property listing information 26, at step 312 the scheduling entity proceeds differently based on whether the user is an ordinary user, such as the buyer 28, or a professional user, such as the agent 25. If the user is an ordinary user, but has an agent 25 (at step 313), the scheduling entity displays a message informing the user that his agent 25 is required to make the appointment (step 314), and the scheduling entity sends the agent 25 a message, through a communication means such as the agent's computer 23, requesting the agent 25 to schedule the appointment for the buyer 28 (step 315). The agent 25 may then reinitiate the appointment request beginning at step 301 and proceeding through step 317. If the user is an ordinary user, but does not have an agent 25 (at step 313), the scheduling entity sends a message to the listing agent or another agent that can help the user access the house. At step 317, the scheduling entity determines if the listing agent or another agent to which a message was sent can attend a showing. If the agent cannot attend the showing at step 317, a subsequent message is sent to the listing agent or another that can help the user access the house. At step 317, if an agent is determined that can attend the showing, the method proceeds to step 318.

At step 318, if the timeslot selected by the user in step 303 is designated as "Unavailable", the scheduling entity displays an appointment rejection message. The agent 25 may then begin again from step 301 and select a new timeslot for the appointment. If the new timeslot is designated as "Available" (step 319), the system displays a message confirming the appointment.

At step 323, if the timeslot selected by the user in step 303 is designated as "Pending Approval", the scheduling entity initiates a pending approval process 4000 to attempt to schedule the appointment. The pending approval process 4000 is described in detail in reference to FIG. 4, herein. At step 322, if the appointment is approved following the pending approval process 4000, the scheduling entity displays a message confirming the appointment (step 319). If the appointment is not approved following the pending approval process 4000, the agent 25 may then begin again from step 301 and select a new timeslot for the appointment.

Referring back to FIG. 2, in another non-limiting embodiment, the appointment scheduling process 3000 is performed automatically by the scheduling entity, acting as the user on the behalf of the buyer 28, beginning at step 214. Except for cases where the an appointment is rejected for a property designated in the property listing information 26 as "Pending Approval"—as described in reference to the pending approval process 4000 of FIG. 4—the scheduling entity handles all steps in the appointment scheduling process 3000 for each property in the tentative appointment schedule, and no further input from the buyer 28 or the agent 25 is required.

Figure 4:
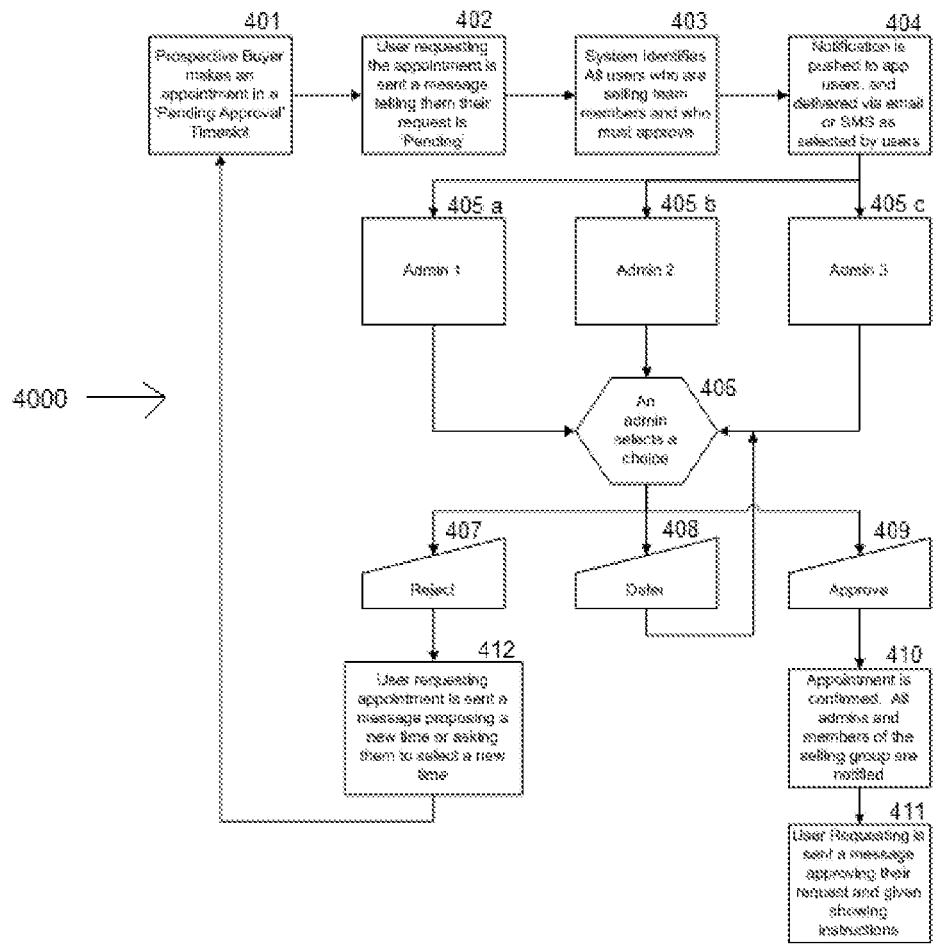
FIG. 4 illustrates a flow diagram for the pending approval process of the scheduling system of the present invention.

Referring now to FIG. 4, the pending approval process 4000 begins at step 401 when the user—or the scheduling entity acting on the user's behalf—submits an appointment request for a property at a timeslot designated as "Pending Approval." At step 402, the scheduling entity sends the buyer 28 an automated message, through a communication means such as the buyer's computer 30, informing the buyer 28 that the appointment is pending. At step 403, the scheduling entity identifies the administrators 405a-405c associated with the property. The administrators 405a-405c are designated by the super-administrator when the piece of property is listed (refer back to FIG. 6). The administrators 405a-405c have the authority to approve the appointment. At step 404, each of the administrators 405a-405c is sent an approval request message in his or her preferred message format. Examples of preferred message formats include an SMS message, email, mobile application, or any combination of the above. The approval request message contains a plurality of clickable links corresponding to a plurality of choices available to the administrators 405a-405c in response to the approval request message. The plurality of choices available to the administrators 405a-405c includes rejecting the appointment request 407, deferring to the other administrators 408, or approving the appointment 409.

If any of the administrators 405a-405c approves the appointment request, the appointment is confirmed and the responses of the rest of the administrators 405a-405 are not required. At step 410, the scheduling entity sends the seller 20 and the administrators 405a-405c a message, through a communication means such as the seller's computer 31, notifying them that the appointment has been approved. At step 411, the scheduling entity sends the buyer 28 and the agent 25 a notification of approval message through a communication means such as the agent's computer 23. The notification of approval message may include instructions for the appointment, such as driving directions.

At step 412, if any of the administrators 405a-405c rejects the appointment request, the scheduling entity sends the buyer 28 and the agent 25 a notification of rejection message, through a communication means such as the agent's computer 23, requesting that the buyer 28 select a different timeslot to schedule an appointment. In a non-limiting embodiment, the administrators 405a-405c have the option to suggest an alternative appointment time, which is communicated to the buyer in the notification of rejection message.

If any of the administrators 405a-405c defers the appointment request, the scheduling entity does not proceed until at least one of the administrators 405a-405c accepts the appointment request or rejects the appointment request. The last of the administrators 405a-405c to respond to the approval request message is not given the option to defer the appointment. In other words, the system will not allow all of the administrators 405a-405c to defer the appointment request.

In an alternate embodiment, all of the administrators 405a-405c must approve the appointment request or the appointment request will be rejected. In this embodiment the scheduling entity sends the appointment rejection message to the buyer when any of the administrators 405a-405c rejects the appointment, or the scheduling entity sends the notification of approval message after all of the administrators 405a-405c accept the appointment.

Figure 5:
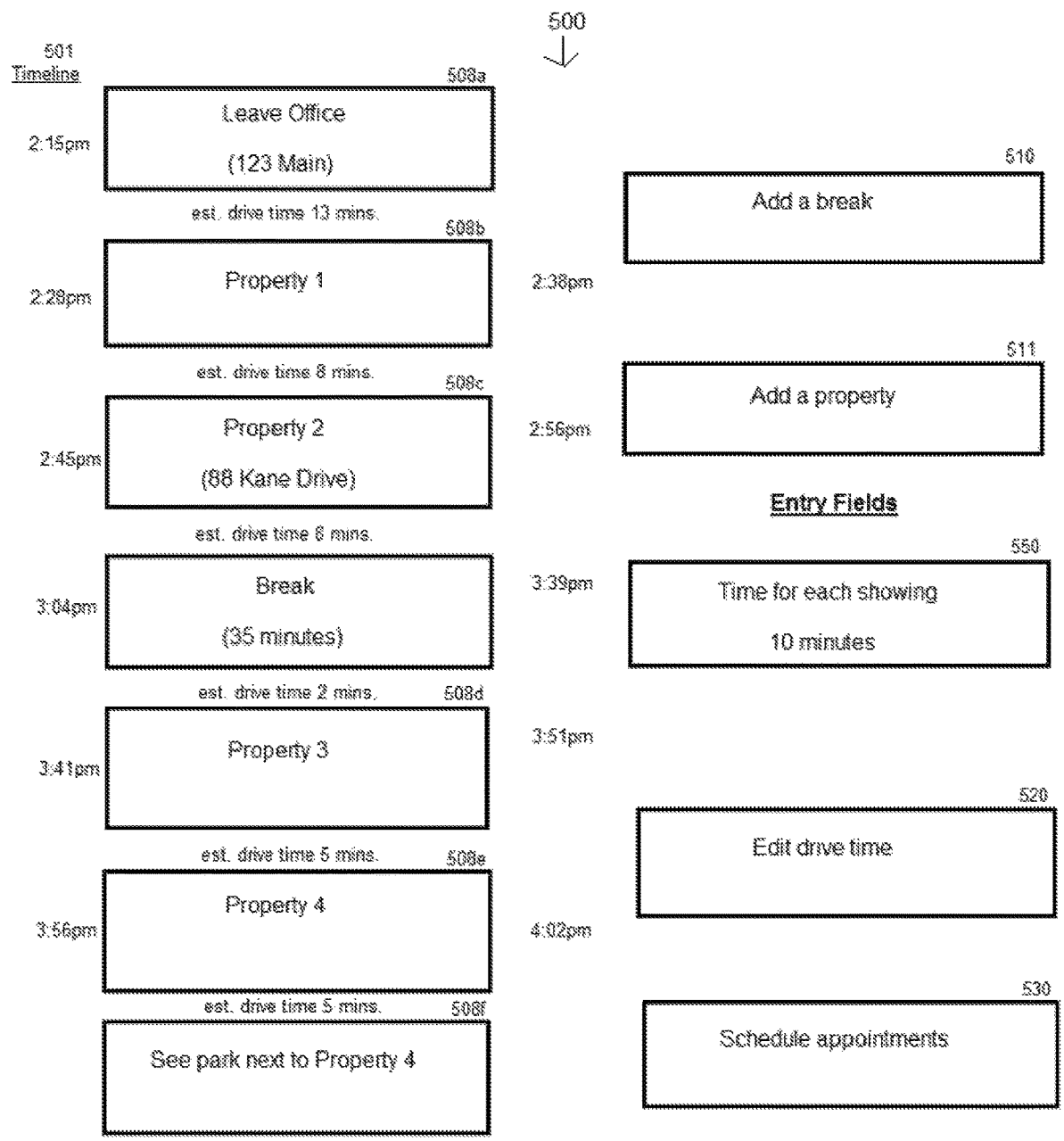
FIG. 5 is a view of a graphical user interface (GUI) showing the itinerary scheduling process of the present invention.

Referring now to FIG. 5, an editable itinerary 500 as displayed on a graphical user interface (GUI), such as the display device of the mobile device, is shown. The editable itinerary 500 is viewed by the agent 25 after the scheduling entity has generated the tentative appointment schedule, as described in reference to FIG. 2. The editable itinerary 500 includes a timeline 501 divided into one or more appointment blocks 508a-508f. Each of the one or more appointment blocks 508a-508f corresponds to an appointment in the tentative appointment schedule. The agent may manually add additional appointment blocks, break blocks 510, or activity blocks 511 to the timeline 501. For example, the agent may manually add an activity block 511 to the timeline, where the activity block 511 corresponds to a visit to a park near one of the properties in the tentative appointment schedule.

The agent 25, or appointment scheduler, sets the length of each appointment by entering an appointment length in an entry field 550. The entry field may be a text box or a dropdown menu, for example. Between each of the one or more time blocks 508a-508f, the break blocks 510, and the activity blocks 511, an estimated travel time 520 between subsequent appointments is displayed. The estimated travel time 520 is calculated by the scheduling entity by retrieving geographical data and traffic data from the server computer 24. For example, the scheduling entity may retrieve the geographical data and the traffic data from a client such as Google Maps API. The agent can manually adjust the estimated travel time 520 based on personal experience or for any other reason. Using the appointment length and the travel time 520, the scheduling entity calculates and graphically displays on the editable itinerary an arrival time and a departure time for each of the appointments in the tentative appointment schedule.

Once the agent 25 is satisfied with the timeline 501, the agent 25 executes a command object 530 which causes the scheduling entity to proceed with the itinerary creation process 2000, as described in reference to FIG. 2.

Figure 7:
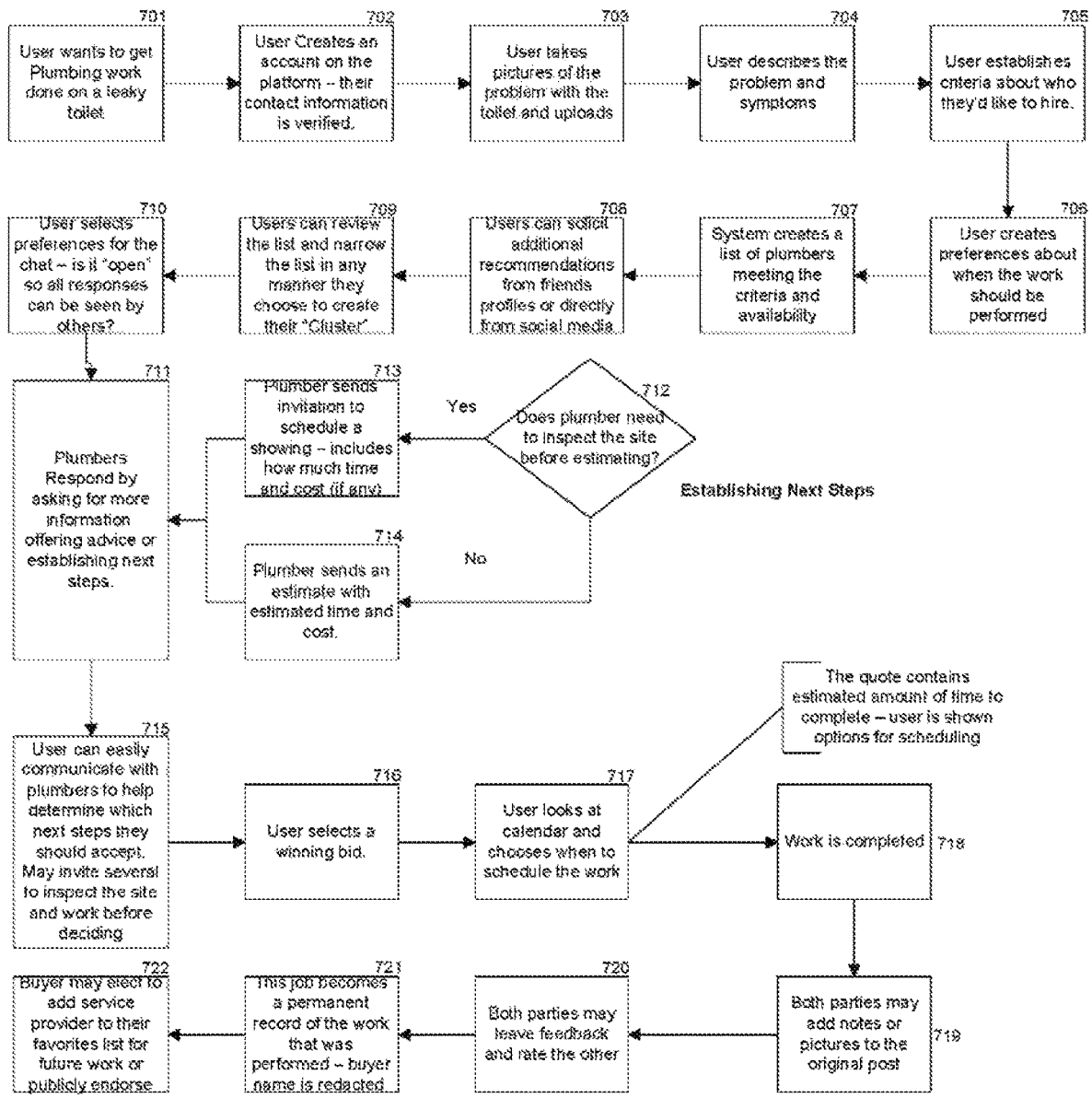
FIG. 7 illustrates a flow diagram of the service provider hiring process of the present invention.

Referring now to FIG. 7, in another embodiment the scheduling entity may be used to hire service providers. Beginning at step 701, the buyer 28 determines a job that the buyer 28 wishes to hire a service provider to perform. For example, the buyer 28 may wish to hire a plumber to fix a leaky toilet. At step 702, the buyer 28 creates and verifies an account on the scheduling entity, as described in reference to FIG. 3 at steps 304 to 310. At step 703, the buyer creates an original post detailing the job. The buyer 28 uploads a picture of the job, for example the leaky toilet, to the original post. At step 704, the buyer 28 adds a description of the job, or symptoms of a problem the buyer 28 is experiencing, to the original post. The original post is the stored in the server computer 24.

With continuing reference to FIG. 7, at step 705, the buyer 28 sets hiring criteria of service providers the buyer 28 would like to hire. For example, the hiring criteria may be that the buyer 28 will only hire service providers who have received a predetermined number of favorable customer reviews. At step 706, the buyer 28 inputs a desired time at which the service should be completed. At step 707, the scheduling entity generates a provider list of one or more service providers who meet the hiring criteria and are available at the desired time. At step 708, the buyer 28 may solicit customer opinions about the one or more service providers from other users' profiles, or from users of other social media. For example, the scheduling entity may contact users of a social networking site such as Facebook who have hired the one or more service providers in the past. At step 709, the buyer 28 reviews the provider list and, for any reason including but not limited to customer opinions, may remove any of the one or more service providers from the provider list.

At step 710, the scheduling entity generates a private chat room, for example, a real-time instant messaging service, between the buyer 28 and the one or more service providers in the provider list. No one other than the buyer 28 and the one or more service providers in the provider list are able to access further communication regarding the job. At step 711, the one or more service providers in the provider list use the chat room to contact the buyer 28 to ask for more information regarding the job, offer advice, propose one or more next steps, or any combination thereof. The one or more next steps are proposed at step 712. The one or more next steps may include prerequisites to perform the job. For example, if the one or more service providers need to inspect the job before performing the job, at step 713 any of the one or more service providers sends an inspection invitation to the buyer 28. Alternatively, if no prerequisite activities are required before the job can be performed, at step 714, any of the one or more service providers sends the buyer 28 a bid, which includes an estimated time to complete the job and an estimated cost to complete the job.

With continuing reference to FIG. 7, at step 715, the buyer 28 accepts or rejects the proposed next steps. For example, the buyer 28 may respond to or defer the inspection invitation. At step 716, the buyer 28 awards the job to a winning bidder selected from the provider list of the one or more service providers. The buyer may award the job based on the bid, the customer opinions, other reasons, or any combination thereof. At step 717, the scheduling entity compares the availability of the buyer 28 with the estimated time to complete the job, and the buyer 28 selects an appropriate time to schedule the job. At step 718, the job is completed.

At step 719, the buyer 28 and the winning bidder may update the original post. For example, the buyer 28 may upload a picture showing the completed job. At step 720, the buyer and the winning bidder may exchange feedback, which is added to the original post. At step 721, the original post is archived on the server computer 24, with the name of the buyer 28 redacted, so that subsequent users may view the archived post when shopping for service providers. The archived post also serves as a permanent record of the job. At step 722, the buyer 28 may add the winning bidder to a favorite provider list. The favorite provider list allows the buyer 28 to easily contact service providers to perform subsequent work. The favorite provider list can also be viewed by other users shopping for service providers.

Figure 8:
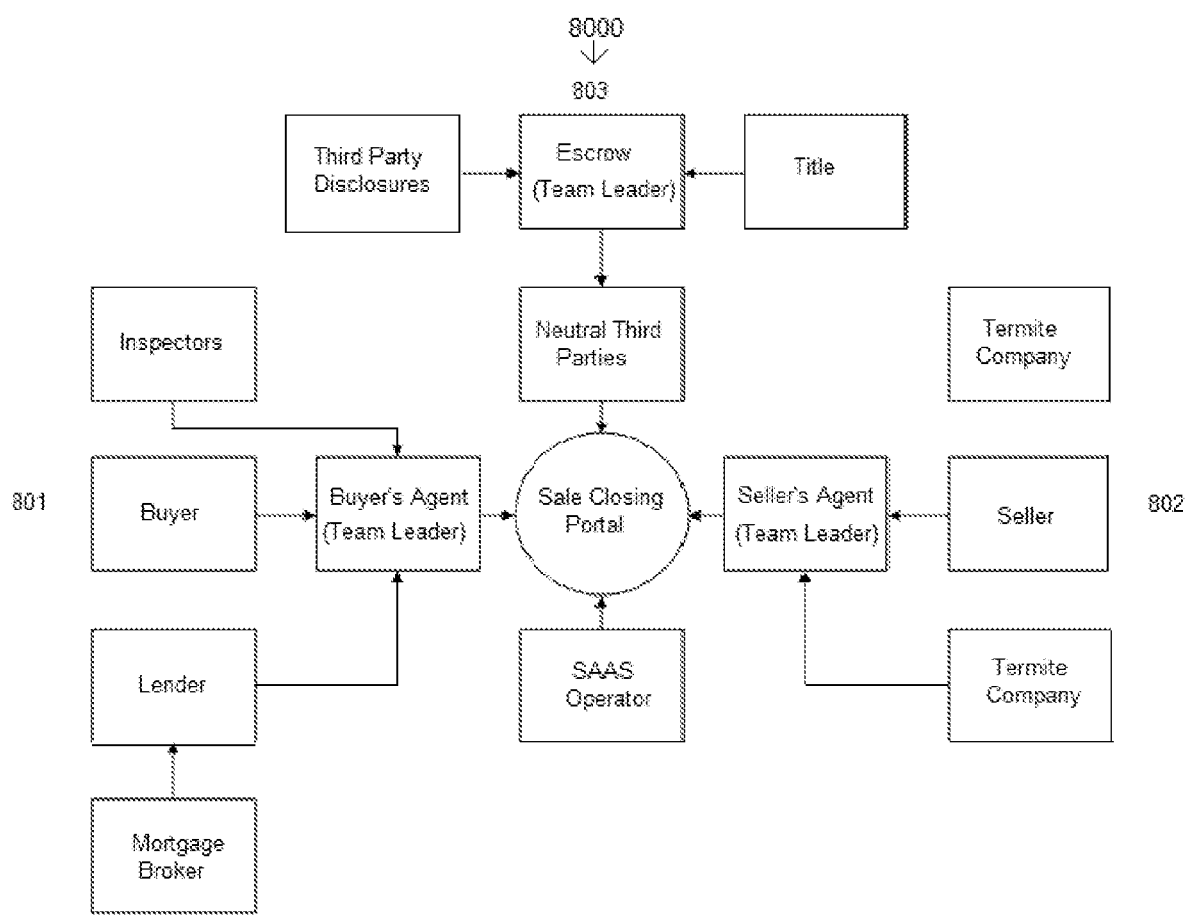
FIG. 8 illustrates a flow diagram of the sale closing platform of the present invention.

Referring now to FIG. 8, in another embodiment the scheduling entity further includes a sale closing portal 8000. The sale closing portal 8000 is a central messaging and document exchange that allows for collaboration and sharing of documents used to close a transaction, such as the sale of a property corresponding to the property listing 22. The sale closing portal 8000 allows documents to be uploaded to and downloaded from the server computer 24 by the participants in the transaction. In a non-limiting embodiment, three teams of participants have access to the sale closing portal 8000, and each team has one member designated as a team leader. A buyer team 801 includes the buyer 28, the agent 25 of the buyer 28, and other parties acting on behalf of the buyer 28. For example, the buyer team 801 may also include a property inspector, a lender, and a mortgage broker. In one possible embodiment, the agent 25 is designated as the team leader of the buyer team 801. A seller team 802 includes the seller 20, a listing agent, and other parties acting on behalf of the seller 20. For example, the seller team 802 may also include a termite company. In one possible embodiment, the listing agent is designated as the team leader of the seller team 802. A third party team 803 includes neutral parties, such as an escrow officer and a title officer. In one possible embodiment, the escrow officer is designated as the team leader of the third party team 803.

The sale closing portal 8000 allows members of each team to communicate with members of their own team, and, with permission, to communicate with members of the other teams. Documents uploaded by any member of the buyer team 801, seller team 802, and third party team 803 cannot be accessed by members of the other teams unless the team leader of the uploading team gives one or all of the other teams permission to access those documents.

For example, the escrow officer may upload a bill of sale which requires the signature of both the buyer 28 and the seller 20 to the server computer 24. The escrow officer then grants permissions to the buyer team 801 and seller team 802, allowing the members of the buyer team 801 and the members of the seller team 802 to access the bill of sale from the server computer 24. Through the sale closing portal 8000, members of both the buyer team 801 and the seller team 802 receive notification messages directing them to log in to the sale closing portal 8000 to electronically access the document from the server computer 24. The buyer team 801 and seller team 802 may then retrieve the bill of sale from the server computer 24, and may electronically sign the bill of sale. In an alternative embodiment, any access to the bill of sale and any signature of the bill of sale is time stamped and stored in the server computer 24, to eliminate disputes relating to the bill of sale.

The sale closing portal 8000 may also be used for communication and exchange of documents within a team, such as the buyer team 801. For example, the lender on the buyer team 801 may upload a document that requires the signature of the buyer 28, such as a mortgage agreement. The sale closing portal sends a message to the buyer 28, for example, through the buyer's computer 30, prompting the buyer 28 to log in to the sale closing portal 8000 and electronically sign the mortgage agreement. The lender would only grant permissions to the buyer 28 and the agent 25 to access the mortgage agreement from the server computer 24. The seller team 802 and noncritical members of the buyer team 801 and the third party team 803 would be prohibited from accessing the mortgage agreement because the lender would not grant those members permissions to access the mortgage agreement from the server computer 24.

Figure 9:
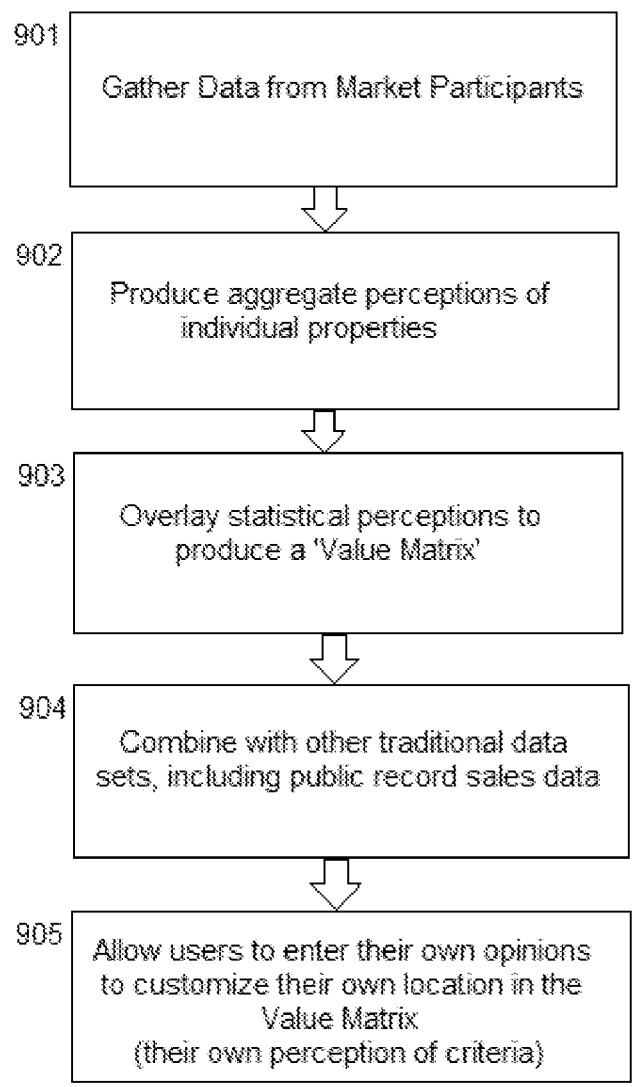
FIG. 9 illustrates a flow diagram of the automated valuation model of the present invention.

Referring now to FIG. 9, in another embodiment the scheduling entity includes a feedback application which the scheduling entity uses to generate an estimated market value for a piece of property. When enough feedback across multiple properties has been accumulated, the feedback application will be able to estimate the value of newly listed property using information from comparable properties already stored in the system. The estimated market value can be used to supplement the valuation of an appraiser, and is particularly valuable before an official appraisal is made on the piece of property. The feedback application also produces metrics that may be used to assign values to other pieces of property. For example, the feedback application will assess factors that caused an increase or decrease in the value of one property and use those factors to assign an accurate market value to other properties.

Beginning at step 901, market data is gathered from each participant. For example, the scheduling entity may request that the agent 25 input his or her perception of each property viewed with the buyer 28. The agent 25 may input his or her perceptions of factors, such as the interior condition, exterior condition, amenities, and location of the property, along with pricing expectations and opinions on various other data points. The responses of the agent 25 are then transferred to and stored on the server computer 24, and are used by the feedback application to predict a value of other properties.

For example, if a first property has a poor interior condition, as perceived by the agent 25, the feedback application would account for the poor interior condition of the first property when predicting a market value for a second property which has a better interior condition. Current practices—which are only capable of comparing macro-factors, such as location, to predict the value of the second property relative to the value of the first property—would not be able to account for the disparate interior conditions of the first property and the second property when predicting the value of the second property. The feedback application, by contrast, would adjust the predicted value of the second property by taking account of the interior condition of the second property relative to the interior condition of the first property.

In a non-limiting embodiment, the buyer 28 or the agent 25 is encouraged to provide feedback through an incentives system. The buyer 28 or the agent 25 receives a number of rewards points for each unique feedback provided. The number of awards points may be greater for more experienced users or greater for feedback which contributes new information to the feedback stored on the server computer 24.

At step 902, the scheduling entity aggregates the data stored in the server computer 24. Multiple agents' perceptions of the same property are overlaid to generate an automated valuation model.

In addition to generating the automated valuation model, the feedback application serves as a self-assessment tool for the agent 25 and an agent-selection tool for the buyer 28. Feedback the agent 25 submits for a property is compared with the feedback that other professionals have submitted for that property to assess how in tune the agent 25 is with the market consensus. The agent 25 can then use that assessment to improve his or her skills.

When a property sells, the feedback that the agent 25 submitted for that property is compared to the actual sale price of that property. The agent 25 will be given an overall score based on how close the actual sale price was to the perceived the value of the property as submitted by the agent 25. The overall score is updated each time the agent 25 submits feedback for a property that sells. The agent 25 can then use that assessment to improve his or her skills.

The agent 25 receives a commendation if his feedback is within a predetermined range of the actual sale price. This information is then conveyed to the buyer 28 so that the buyer 28 can choose the best possible representation. The feedback application can further break down the feedback submitted by the agent 25 to determine whether the agent 25 has a particular strong or weak grasp of one region's market compared to another. For example, the agent 25 may have a very accurate perception of property values in a first neighborhood but a weaker perception of property values in a second neighborhood. The buyer 28 may therefore be willing to trust advice of the agent 25 only in regard to properties in the first neighborhood.

The feedback application can also analyze trends in the feedback submitted by the agent. For example, the feedback application is able to determine if the agent 25 typically estimates property values above the market consensus. Once the agent 25 has entered enough feedback, the feedback application can extrapolate the feedback to other properties. For example, if the agent 25 invariably overestimates property values, the feedback application will adjust the automated valuation model to account for the overestimation.

Figure 10:
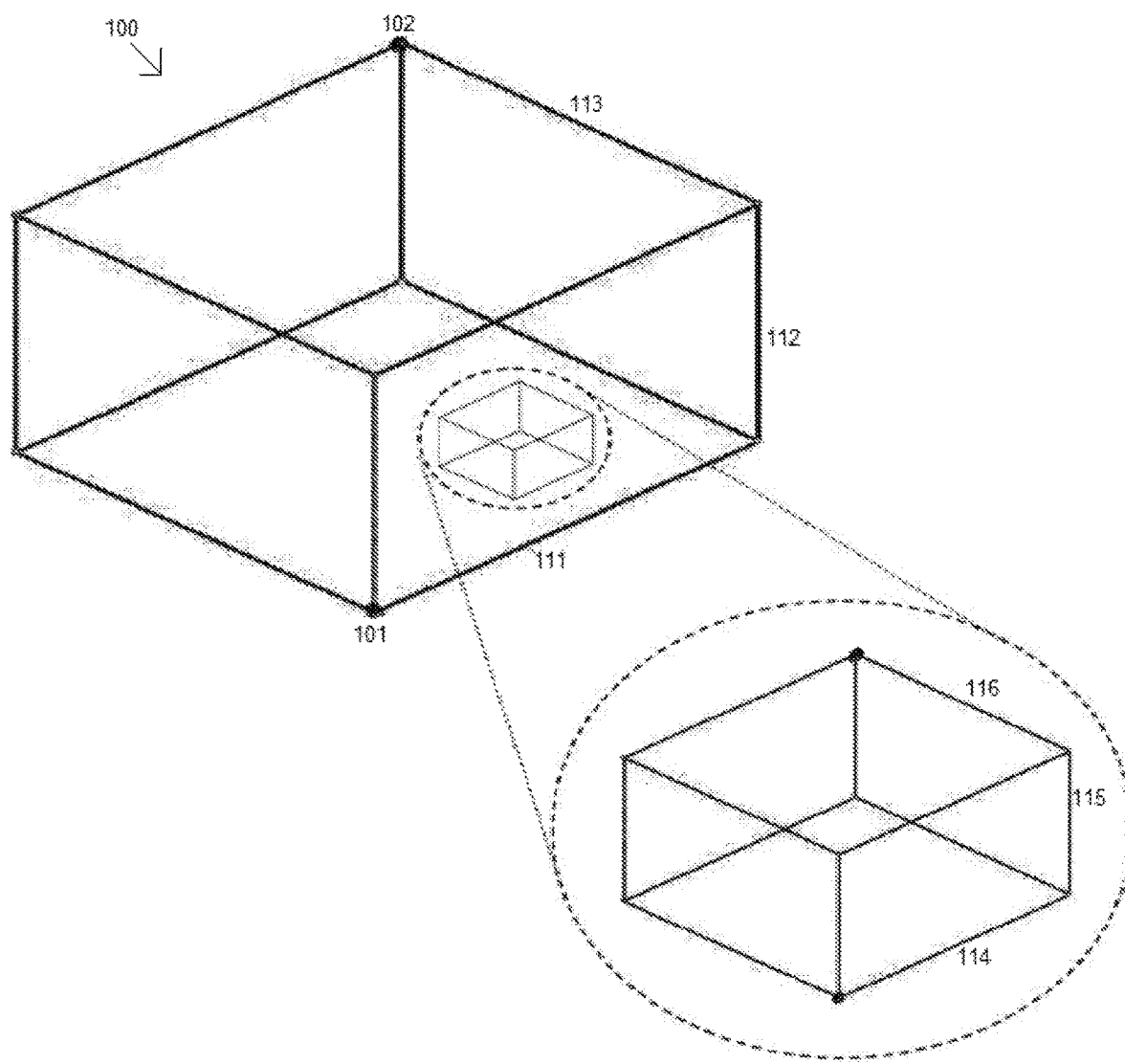
FIG. 10 illustrates a 4-D automated valuation model of the present invention.

Referring now to FIG. 10, a graphical representation of an automated valuation model is shown. The estimated market value of a property is graphically represented on a four-dimensional plot 100. A first corner 101 of the plot 100 represents a lowest possible value, and a second corner 102 of the plot 100, which is located diagonally from the first corner 101, represents a highest possible value. The plot 100 includes three axes 111, 112, 113 which correspond to valuation factors.

For example, a first axis 111 may correspond to a valuation analysis of comparable properties to the property being assigned the estimated market value. A second axis 112 may correspond to a supply and demand analysis of the market for the property being assigned the estimated market value. A third axis 113 may correspond to an aggregation of market participant feedback. The aggregation of market participant feedback may be generated from a subset automated valuation model comparing valuation factors, such as an analysis of amenities offered by the property to be assigned the estimated market value, an analysis of the interior condition of the property to be assigned the estimate market value, and an analysis of the exterior condition of the property to be assigned the estimate market value. A first subset axis 114 may correspond to amenities, a second subset axis 115 may correspond to interior condition, and a third subset axis 116 may correspond to exterior condition. It may be appreciated that alternative valuation factors may be utilized for each axis of the automated valuation model and the subset automated valuation model depending on the nature of the property being assigned the estimated market value.

Comparable properties having high values, a high-demand market, and positive market perception will drive up the estimated market value of the property to be assigned a value. Conversely, comparable properties having low values, a saturated market, and negative market perception feedback will drive down the estimated market value of the property to be assigned a value. The valuation factors are accessed from the server computer 24, and are then be accordingly plotted on their corresponding axis 111, 112, 113 of the four dimensional plot 100. In this manner, the value of a property based on multiple interrelated valuation factors may be graphically represented on the four dimensional plot 100.

Various pricing factors for a number of different key metrics for judging an asset include:

1. Time—Let's say that on May 1, a user would like the value for Property A. The most recent comparable sale of a property with similar characteristics is Property B, which closed on April 1, 30 days ago. Now initially, this seems like a very good comp of a recently sold property, however, what isn't shown is that the closing happened after a 60 day escrow and that they negotiations for the purchase occurred over a 2 week period in late January. While it would be reasonable to say that this property that sold 1 month ago is a very close indicator, what is actually being compared is a purchase initiated in January, which is traditionally a month that has less activity, less demand, and can produce a lower sale price than the spring months when homebuyers begin looking in earnest.

2. Macro Market conditions—market sentiment is a lagging indicator. Even if rates spiked in April, which traditionally has a chilling effect on home prices, homes that entered escrow in March and closing in May will still point to an increasing market, which is predictably at the tail end of its gains. This is why closed comparables as a basis for valuing a property today is a flawed game at best. Using most aggregated indicators of housing market strength and new loan applications are also very much lagging indicators.

3. Micro market conditions—Even more difficult than macro conditions is micro conditions. When the largest employer in town XYZ surprisingly shut its doors, what is to suggest that demand has subsided and that supply will increase as newly unemployed workers look to unload the homes that they can no longer afford? Wouldn't demand play a factor? How can we understand the number of new buyers in a market?

4. Exterior property condition—there is no standardized method to record the condition of a property. Even if there were, there is currently no data set that looks to quantify this and pictures of a property provided by realtors of closing sales may provide a little evidence of condition, it is generally not enough to produce a drastically better model for producing different valuations taking into account for exterior condition. If a well-built modern home that is 2,500 SF, has 3 BRs and 2 Bas sells for $300,000 and 1 week later, we are trying to value the same home on the same block, but this home is in disrepair and has some sort of functional obsolescence, there are no data sets to explain the differences in the home.

5. Interior property condition—while Exterior condition is difficult, imagine how much variance can arise from different interior property conditions. What if the interior of a home has $100,000 in upgrades compared to the one that sold last week that has identical characteristics? An AVM will cause a bias in valuation to bring down the drastically improved and much more desirable property to the level of the average or poorly finished home. This valuation variance would be wide from what the true value is of the property and is not fair to the seller and consumers looking at these inaccurate valuations will have no means to resolve these differences and get accurate estimated pricing for the new home that should get a lot more credit for the extras.

6. Location—while datasets can determine that homes within a certain distance to train stations impact values, subtle differences in local geography or even traffic patterns plays a large role in variances from quantifiable data and highlights the inaccuracies that these electronic guesses produce. There is a store whose neon light flashes in windows, but just 2 houses down doesn't feel as much impact.

7. Supply and Demand—While it is easy to estimate supply—number of homes that are being offered for sale, how many home buyers are looking at these types of homes in this particular market? If we know there are 10 similar homes for sale in a certain market, we have a firm handle on the supply, but how would value be impacted if there were 1,000 buyers looking for this type of home versus only 2 buyers? If a buyer or seller is unaware of the accurate ebbs and flows, they are likely to get a worse deal, or in the case of a buyer, they are unlikely to act appropriately enough to be chosen as the buyer for a property in the midst of intense competition.

8. Outside influence—some factors, like a seller who is in default, like a seller who encounters a buyer with an emotional attachment to their home, a seller who needs to relocate for a job, or other influences that would cause a seller to sell for a price less or more than market cannot be ascertained from looking at public record sale data. Occasionally anomalies will occur and these will be much more apparent when values for other characteristics have been measured by a large sample size of participants.

While a buyer choosing to work with a real estate agent is a way to help mitigate some of the impacts that some of these different metrics have on value and pricing, how can a consumer know which agents really understand the market? While an agent's metric of success is generally how many transactions they handle, how do we know that they are actually getting those clients a good deal and providing accurate information in the face of the mountain of data needed to pay the right price? Many agents get clients because they are good at marketing themselves, but wouldn't finding an agent with their finger on the pulse of the market—one that can identify pricing of any asset accurately and can help their clients close be the only metric that really matters? The only way to get accurate readings on values of any asset is to aggregate opinions of the agents who know the market best. It is our opinion that aggregating opinions of exceptional and experienced agents will produce much more accurate estimates of value than a computer using an algorithm that is primarily based on old information on sales where the negotiations took place 3 months ago and is lacking critical information on several very important characteristics to be able to accurately correlate the value of a sold house with an estimate of value on a house that hasn't yet been considered by the marketplace.

This solution in one embodiment provides a platform which:

1. Helps determine which agents are the most skilled thought leaders and can best estimate valuations on property
2. Gives valuable insight through standardized and aggregated information into characteristics that do not show up in other data sets but that are very much critical in determining true value.
3. Provides real time market sentiment by the agents that can feel even subtle changes.
4. Provides critical demand information by identifying the number of showings taking place in any market.
5. Smooth out anomalies by having a large sample size of data that shows the consensus of market participants. In certain instances where the final sale price has a large variance from market opinions, this variance might be due to some unforeseen circumstance more closely related to the particular participants involved in a transaction. If the market consensus is accurate to a high degree on 99 homes, but is way off on the $100^{th}$ home and the number of market participants interpretations was still elevated, we can determine that this particular sale could be an anomaly, possibly from a distressed seller looking for a quick and certain sale, possibly from an unwilling even, such as a foreclosure, or possibly because the buyer and seller were not at arms-length when the transaction was consummated.

By aggregating opinions and data from a large number of market participants (professionals and buyers), statistical average assumptions can be made and assigned to each closed comparable. These assumptions can also be applied to existing inventory and correlated in real time to help new entrants estimate and determine value in real time.

There are many different types of data that can be gathered to add context to comparable sale data and then quantified by aggregating opinions of market participants:

1. Condition—for each house, market participants will be asked to provide their assessment of condition of the interior and exterior and amenities.
2. Quality/Functionality—Quality of amenities and noticeable construction—this will encourage reporting of functional obsolescence.
3. Location—Location is relative and pockets of good or bad areas cannot be seen on maps or in other data sets. By asking participants to rate each properties location, it allows for a micro-location assessment.
4. Price—Participants are asked what they believe the final sale price will be
5. Market conditions—Rewards and bonuses may be claimed periodically. In conjunction or possible outside of these times, an agent must answer several questions about their feelings about local market conditions in their home area. This will help determine market sentiment from those who are most closely aligned with the market as properties are put into escrow (under contract).

Participants must have appropriate incentives to answer truthfully. Professionals are graded and given clients, compensation or other consideration to be used on products or services. Buyers may be conflicted and choose not to give accurate feedback for houses that they are interested in purchasing, in an attempt to generate leverage, but over time and enough participants, these effects can be smoothed out.

By collecting this data on homes and quantifying market perception at the time leading up to the contract date and sale date, we are adding important context to the eventual sale data publicly available at the recorder's office. Without this data to add context, there is only limited data sets available, which can include size, characteristics, macro location and closing price. Using limited data sets will produce estimates of value, but the range broadens quite drastically from the actual underlying value.

With this data available over time, certain participants will be proven to have more valuable and accurate feedback as their perceptions are compared against closing sale prices. These participants can be more heavily weighted or used to smooth out data anomalies.

When market participant data is established with a reasonable amount of responses to be considered mathematically relevant, these characteristics are recorded and the eventual sale price is attached to this market perception at this point it time. As supply and demand changes over time, these readings can predict upper and lower bounds for property. Correlations made between market participant aggregated data and sale price will be formed.

A tool to harness this information will be created. A 4 dimension matrix will be produced to help a user predict value for a property that has not yet been analyzed by local professionals. Even for a home that has not been subjected to market scrutiny, a matrix can be created that shows how slight changes in data point (e.g. exterior condition or quality) will impact pricing. A user can enter their own rating or perceptions of a houses criteria in order to determine a fairly precise value in the 4D matrix that has been created using similar property in the area as examined and reported by participants. (e.g., When enough market participants submit their perceptions for key data points over a number of properties, their value aggregated, data can be quantified and correlated with closing sale prices of comparable properties sold in the area.)

For all other homes, these data overlays will create a 4D pricing matrix for every home based on publicly available information. The only missing value is for a user to enter their perceptions.

If a user looks at a home that is not on the market, assign values that they believe are appropriate for interior condition, exterior condition, location, amenities and any other measured and collected data set that is aggregated from other market participants on other comparable properties. This will produce a corresponding value based on this market participants perception.

With enough sample size data, thought leaders will be identified, market consensus will be formed, and new participants will be able to take their perceptions and determine a value by using empirically collected date from the professional community that has been aggregated into useful values that can be assigned to different attributes. When overlaying new participant's opinions onto a property, a value can be produced as if the market participants who contributed their opinions had come up with the same consensus. This result will take into account empirical data on homes in a similar location with similar amenities and similar property condition.

As time changes, market participant's perception of market strength will change as well as supply and demand. These subtle changes will cause price fluctuations even when a property with almost identical characteristics and market perception on its qualities are similar. The difference over current models is that smoothing of time differences sometimes do not take into account local supply and demand in favor of a much easier to identify macro economy. Using macro-economic indicators as opposed to locally derived market statistics and perceptions can cause skewed results which can further exacerbate inaccuracies. Also, by keeping local market strength data in conjunction with sales data, it becomes easier to more quickly identify changes in market direction and force behind those changes. In an ideal world, we will attempt to not only identify closing date in conjunction with models, but also contract date, so that accurate market conditions can be recorded. It is important to know exactly the feelings when the contract was created and agreed, as opposed to when it closed. An escrow can take several months to close from initial contract date and that misperception can further skew results.

So as to not skew results, and to allow a user opinions in order to best harness the power of aggregated professional opinions, a user is asked to overlay their own perceptions of these datasets and a value will be produced that will essentially estimates the value if the professional community had shared the user's opinions. With enough data, this 4d matrix will be able to add, subtract based on all of the different data points to come up with a value based on experience of not 1 broker and not 1 market participant, but will enjoy smoothing from 100s of professional and market participant opinions. What this system will allow a user to do is *ask* 1,000s of professionals a question like this.

For example, if a buyer wants to buy a 3 bedroom, 3 bathroom, 2,500 square foot house with a pool in this neighborhood, TODAY, that on a 10 scale has a 9 interior condition, a 4 exterior condition. What do you think the value would be. Then, what is returned, is an answer based off of 1,000s of responses from market participants on home on this block to determine how location is impacted and then 100s of real time responses for similar homes in the area that are on the market right now. This response can be compared to a traditional valuation based off of recent closed sale data and a more accurate value can be produced—one that takes into account property condition, location and current real-time market conditions.

As professionals contribute data, they are rated on accuracy against the group. Market participants are asked to rate interior, exterior condition, location and their opinion of value for each property they visit. Accuracy can be measured against the overall average for the group with respect to the characteristic ratings, and/or by assessing their estimate of value from the overall closing price of the asset. Trends and reliability for participant's responses could indicate that a certain agent has a better handle on their market and could be a better selection as an agent for a buyer looking to purchase a property. Thought leaders can be rewarded by being recognized for their proficiency and be rewarded for contributing data into the platform.

By combining a scheduling platform to make showings simple to negotiate and incorporating an easy method for submitting ratings, we can create these data sets with enough opinions to transform the AVM market from being a ballpark estimate to being a very close estimate of the true value.

Allowing a market participant refine their interpretations of the actual condition of the measurable characteristics like interior, exterior and location, should allow for individual preferences and opinions to help buyers determine what they think a property is worth given the importance that they place on certain aspects.

BUYER 1
BUYER 2
BUYER 3

Professionals and market participants alike can improve their understanding of local market forces and increase their skills in order to more easily identify properties with pricing that represents value and/or to help their clients. Participants that submit their opinions will be shown final results and in what percentile they appeared. They can see the final results and compare their initial impressions and this will make them more effective as agents or market participants. By participating and being shown final results of a sale and being able to see how close/far they were from the final result will help them to get a better feel for the market. They can see aggregated and anonymized data that reflect others opinions in a format that could be similar to this:

| | Your submissions | | | | |
|---|---|---|---|---|---|
| Characteristic | Your Percentile | Your Submission (out of 10) | Professional Opinion (responses 43) | Participant Opinion (responses 15) | Actual |
| Interior Condition | 89% | 7.5 | 7.9 | 7.0 | |
| Exterior Condition | 45% | 6 | 7.2 | 7.2 | |
| Amenities | 93% | 8 | 8.1 | 8.1 | |
| Location | 35% | 4 | 6.3 | 6.3 | |
| Market Strength | 60% | 5 | 5.5 | 5.5 | |
| Price | 59% | $550,000-$560,000 | $578,650 | $578,650 | $581,000 |
| TOTAL | 73% | | | | |

Over time, participants and agents can see their results and rankings over multiple properties. Agents will be ranked against other agents. These statistics will keep yearly results data as well as monthly rankings as well. Competitions and prizes can be awarded based on performance over any time frame. Agents can choose to publish or release their accuracy and market knowledge statistics if they choose. Only anonymized and aggregated data will provide information without subjecting individual agents to answering for their performance. Agents can improve performance over time and hone their skills by being shown their monitored performance and how it relates to others and the final results.

Figure 11:
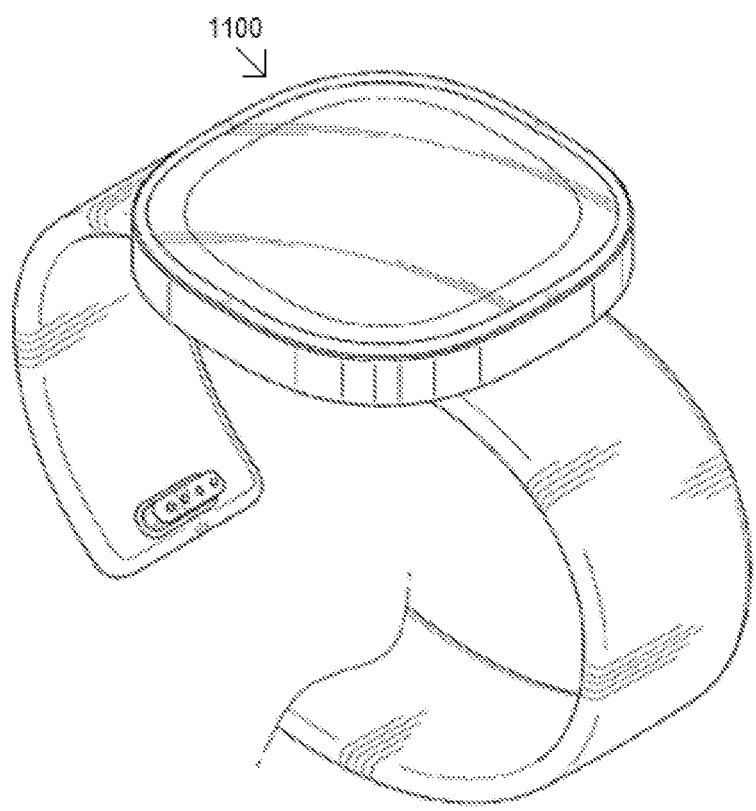
FIG. 11 illustrates a wearable monitoring device of the present invention.

The present invention also provides for the safety of all parties involved in the scheduling process. Referring now to FIG. 11, a wearable monitoring device 1100 is shown which includes at least one processor and at least one set of monitoring program instructions which may be executed by the processor. When executed, the at least one set of monitoring program instructions cause the monitoring device 1100 to determine and monitor the location of a user who wears the monitoring device 1100. Further, the at least one set of monitoring program instructions causes the monitoring device 1100 to determine and monitor at least one vital sign of the user, for example the heart rate of the user.

With continued reference to FIG. 11, the at least one set of monitoring program instructions causes the monitoring device 1100 to generate a baseline range of the at least one vital sign, corresponding to the normal condition of the at least one vital sign for the user. For example, the monitoring device 1100 may generate a baseline range for the heart rate of the user by measuring the heart rate of the user while the user is relaxed and not under stress.

At predetermined intervals, the at least one set of monitoring program instructions causes the monitoring device 1100 to determine the location of the user and the at least one vital sign of the user. If the at least one vital sign is outside the baseline range, the monitoring device 1100 alerts the user and awaits a status response from the user. The user may respond with either an "all clear" command, a "send help" command, or the user may enter no response. If the user enters the "send help" command, or if the user enters no response, the at least one set of monitoring program instructions causes the monitoring device 1100 to send a help alert and the location of the user to the supervisor of the user. The supervisor of the user may be a boss, a coworker, a family member, a friend, or any other entity capable of responding to the help alert.

It may be appreciated that the wearable monitoring device 1100 may be of any style, such as a wristband, necklace, or bracelet. In a non-limiting embodiment, the wearable monitoring device 1100 is worn by the user in an inconspicuous location so as to not raise suspicion. In a further non-limiting embodiment, the "send help" command is disguised so that anyone other than the user does not know that the "send help" command has been entered.

In another embodiment of the present invention, the buyer 28 completes one or more quests in a virtual reality scavenger hunt. A graphical user interface (GUI) on a display device displays a series of photographs stitched together to form a virtual environment of real world settings, such as a retail store or business district. The scavenger hunt prompts the buyer 28 to complete one or more quests in exchange for clues or a prize. For example, a video integrated into the virtual environment may display a prerecorded sales presentation. The sales presentation may give the buyer 28 the location of a prize within the virtual environment, or the sales presentation may lead the buyer 28 to another clue. The buyer 28 is then required to navigate to a different location in the virtual environment to access the prize or the other clue.

Clues and prizes may also be delivered in a manner other than the prerecorded sales video. For example, the buyer 28 may be required to visit a merchant's website in order to access a clue or prize. Other clues or prizes may be purchased by the buyer 28 or given to the buyer 28 in exchange for watching an advertisement.

Some quests may require the buyer 28 to perform a skill or logic exercise, for example, requiring the buyer 28 to solve a puzzle. Quests may be linked to other quests with an increased prize if the buyer 28 completes all the linked quests.

The prerecorded sales presentation or other clues may be delivered by an owner or an employee of the retail store in order to add to the life-like nature of the virtual environment. Further, virtual interaction with the owner or employee may establish a comfort level which encourages the buyer 28 to visit the retail store in the real world.

The prize may be anything of use to the buyer 28, such as cash, a discount or coupon to the retail store, other merchandise services, or entry into a random drawing. The prize is redeemable through an account which the buyer 28 must sign up for. In one embodiment, the prize may be delivered to the buyer 28 in the form of a QR code which a merchant may scan in order to give the buyer the prize. For example, the QR code may be scanned by the merchant when the buyer 28 checks out at the merchant's store.

In one embodiment of the virtual scavenger hunt, the buyer 28 wears a virtual reality headset which includes the display device to facilitate a three-dimensional virtual environment.

Figure 12:
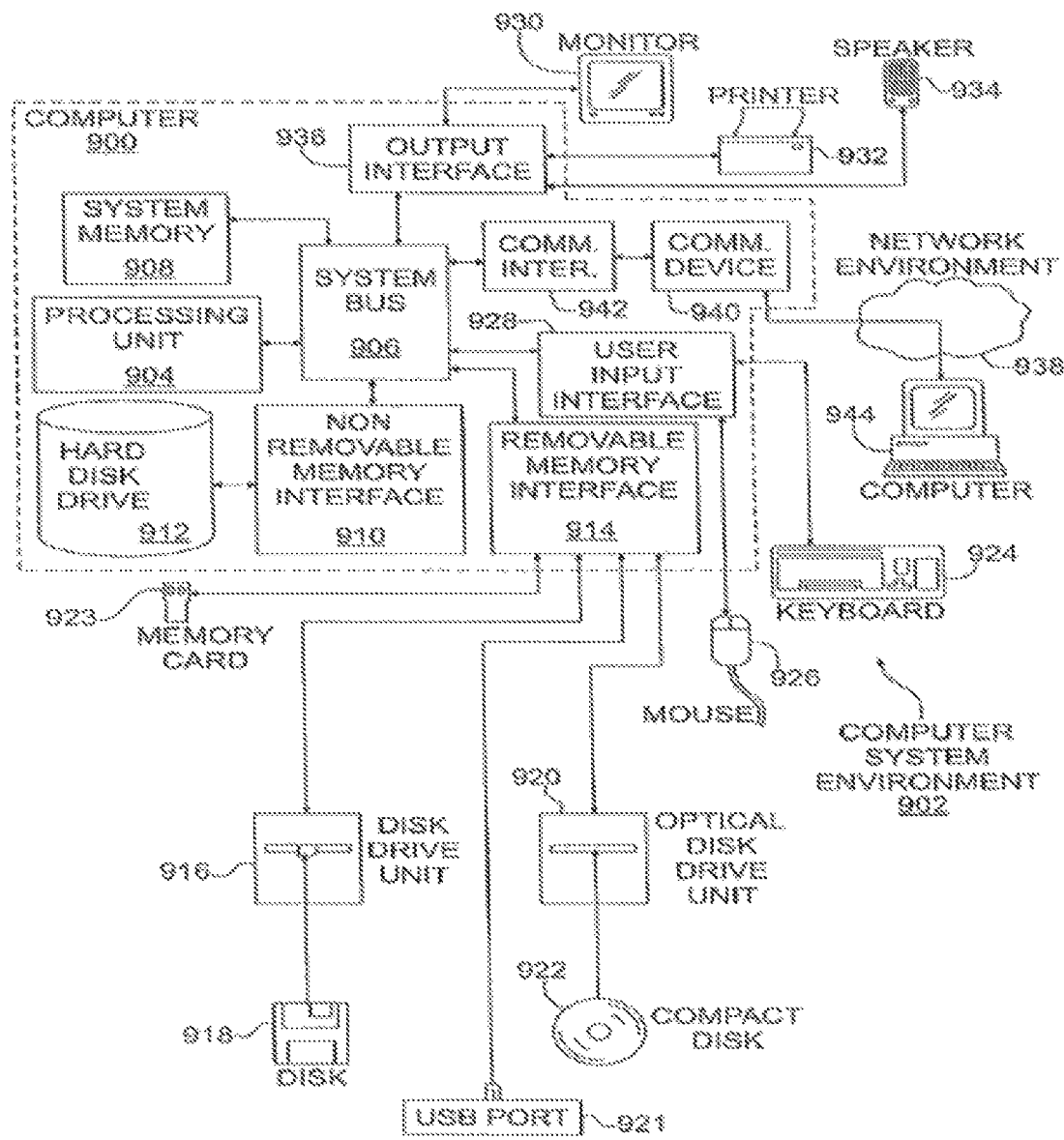
FIG. 12 illustrates a block diagram of the computer system of the present invention.

The present invention may be implemented on a variety of computing devices and systems, wherein these computing devices include the appropriate processing mechanisms and computer-readable media for storing and executing computer-readable instructions, such as programming instructions, code, and the like. As shown in FIG. 12, personal computers 900, 944, in a computing system environment 902 are provided. This computing system environment 902 may include, but is not limited to, at least one computer 900 having certain components for appropriate operation, execution of code, and creation and communication of data. For example, the computer 900 includes a processing unit 904 (typically referred to as a central processing unit or CPU) that serves to execute computer-based instructions received in the appropriate data form and format. Further, this processing unit 904 may be in the form of multiple processors executing code in series, in parallel, or in any other manner for appropriate implementation of the computer-based instructions.

In order to facilitate appropriate data communication and processing information between the various components of the computer 900, a system bus 906 is utilized. The system bus 906 may be any of several types of bus structures, including a memory bus or memory controller, a peripheral bus, or a local bus using any of a variety of bus architectures. In particular, the system bus 906 facilitates data and information communication between the various components (whether internal or external to the computer 900) through a variety of interfaces, as discussed hereinafter.

The computer 900 may include a variety of discrete computer-readable media components. For example, this computer-readable media may include any media that can be accessed by the computer 900, such as volatile media, non-volatile media, removable media, non-removable media, etc. As a further example, this computer-readable media may include computer storage media, such as media implemented in any method or technology for storage of information, such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, this computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the sole exception of transitory, propagating signals. Of course, combinations of any of the above should also be included within the scope of computer-readable media.

The computer 900 further includes a system memory 908 with computer storage media in the form of volatile and non-volatile memory, such as ROM and RAM. A basic input/output system (BIOS) with appropriate computer-based routines assists in transferring information between components within the computer 900 and is normally stored in ROM. The RAM portion of the system memory 908 typically contains data and program modules that are immediately accessible to or presently being operated on by processing unit 904, e.g., an operating system, application programming interfaces, application programs, program modules, program data, and other instruction-based computer-readable codes.

With continued reference to FIG. 12, the computer 900 may also include other removable or non-removable, volatile or non-volatile computer storage media products. For example, the computer 900 may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. However, it is envisioned that other removable or non-removable, volatile or non-volatile computer storage media can be used in the exemplary computing system environment 900, including, but not limited to, magnetic tape cassettes, DVDs, digital video tape, solid state RAM, solid state ROM, etc. These various removable or non-removable, volatile or non-volatile magnetic media are in communication with the processing unit 904 and other components of the computer 900 via the system bus 906. The drives and their associated computer storage media discussed above and illustrated in FIG. 12 provide storage of operating systems, computer-readable instructions, application programs, data structures, program modules, program data, and other instruction-based computer-readable code for the computer 900 (whether duplicative or not of this information and data in the system memory 908).

A user may enter commands, information, and data into the computer 900 through certain attachable or operable input devices, such as a keyboard 924, a mouse 926, etc., via a user input interface 928. Of course, a variety of such input devices may be utilized, e.g., a microphone, a trackball, a joystick, a touchpad, a touch-screen, a scanner, etc., including any arrangement that facilitates the input of data, and information to the computer 900 from an outside source. As discussed, these and other input devices are often connected to the processing unit 904 through the user input interface 928 coupled to the system bus 906, but may be connected by other interface and bus structures, such as a parallel port, game port, or a universal serial bus (USB). Still further, data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of these devices are in communication with the computer 900 through an output interface 936 coupled to the system bus 906. It is envisioned that any such peripheral output devices be used to provide information and data to the user.

The computer 900 may operate in a network environment 938 through the use of a communications device 940, which is integral to the computer or remote therefrom. This communications device 940 is operable by and in communication to the other components of the computer 900 through a communications interface 942. Using such an arrangement, the computer 900 may connect with or otherwise communicate with one or more remote computers, such as a remote computer 944, which may be a personal computer, a server, a router, a network personal computer, a peer device, or other common network nodes, and typically includes many or all of the components described above in connection with the computer 900. Using appropriate communication devices 940, e.g., a modem, a network interface or adapter, etc., the computer 900 may operate within and communicate through a local area network (LAN) and a wide area network (WAN), but may also include other networks, such as a virtual private network (VPN), an office network, an enterprise network, an intranet, the Internet, etc. It will be appreciated that the network connections shown are exemplary and other means of establishing a communications link between the computers 900, 944 may be used.

As used herein, the computer 900 includes or is operable to execute appropriate custom-designed or conventional software to perform and implement the processing steps of the method and system of the present invention, thereby forming a specialized and particular computing system. Accordingly, the presently-invented method and system may include one or more computers 900 or similar computing devices having a computer-readable storage medium capable of storing computer-readable program code or instructions that cause the processing unit 902 to execute, configure, or otherwise implement the methods, processes, and transformational data manipulations discussed hereinafter in connection with the present invention. Still further, the computer 900 may be in the form of a smartphone, a tablet computer, a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

Computer 944 represents one or more work stations appearing outside the local network and buyers', sellers', and agents' machines. The buyers, sellers, and agents interact with computer 900, which can be an exchange system of logically integrated components including a database server and a web server. In addition, secure exchange can take place through the Internet using secure www. An email server can reside on system computer 900 or a component thereof. Electronic data interchanges can be transacted through networks connecting computer 900 and computer 944. Third-party vendors represented by computer 944 can connect using EDI or www, but other protocols known to one skilled in the art to connect computers could be used.

The exchange system can be a typical web server running a process to respond to HTTP requests from remote browsers on computer 944. Through HTTP, the exchange system can provide the user interface graphics. It will be apparent to one skilled in the relevant art that the system may utilize databases physically located on one or more computers which may or may not be the same as their respective servers. For example, programming software on computer 900 can control a database physically stored on a separate processor of the network or otherwise.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. An appointment making and scheduling system for scheduling a plurality of buyers traveling to properties in a geographical area comprising:
   a) a database, having one or more processors configured to store information relating to a plurality of appointments that have been made, a plurality of property information listings, listing factors, property listings in a favorites list, when and how a property may be viewed, information specifying a sequence of said properties to be visited by a particular buyer, and the times the buyer is scheduled to enter and leave said properties;
   b) an itinerary handler, comprising an editable timeline interface and displayed on a mobile device, divided into one or more tentative appointment requests for the buyer and one or more tentative travel times, receiving updates to the tentative appointment requests to view properties for buyers, wherein the itinerary handler receives information based on the plurality of property listings listing from the buyer's favorites list associated with the appointment requests and updates the buyer's property listings in the favorites list, and wherein the one or more tentative travel times include stored information based in part on geographical location data to arrange the properties into a tentative route for minimizing travel time between tentative appointment requests;
   c) an appointment request handler, comprising a computing device, having one or more processors configured to share the tentative timeline with an agent of the buyer and generate a final timeline based on an executed command on the itinerary handler causing the scheduling entity to schedule the appointments on the tentative appointment schedule, wherein the computing device determines when the buyer does not have an agent and schedules, in response to determining the buyer does not have an agent, a plurality of agents until an agent is determined for the buyer, and further wherein any appointment requests are sent by the computing device to sellers relating to the itinerary, to obtain response information associated with the properties requested by buyers, and the responses confirming or providing conflict information; and
   d) an appointment scheduler, comprising one or more processors configured to periodically access and synchronize the itinerary with the appointment request responses, to obtain information relating to appointments, using this information to generate new appointment requests, based on priority information associated with the buyer appointment requested properties and receiving appointment request response information from said appointment request handler, the appointment scheduler further executes a command object causing the scheduling entity to proceed with the itinerary creation process.

\* \* \* \* \*

UNITED STATES PATENT AND TRADEMARK OFFICE
CERTIFICATE OF CORRECTION

| | |
|---|---|
| PATENT NO. | : 11,328,262 B2 |
| APPLICATION NO. | : 14/852145 |
| DATED | : May 10, 2022 |
| INVENTOR(S) | : Dean DiCarlo |

It is certified that error appears in the above-identified patent and that said Letters Patent is hereby corrected as shown below:

In the Claims

Column 30, Line 11, Claim 1, delete "listings listing" and insert -- listings --

Signed and Sealed this
Second Day of August, 2022

*Katherine Kelly Vidal*

Katherine Kelly Vidal
*Director of the United States Patent and Trademark Office*